United States Patent [19]
Kaneko et al.

[11] Patent Number: 4,758,910
[45] Date of Patent: Jul. 19, 1988

[54] METHOD OF CONTROLLING A TAPE DECK DISPLAY

[75] Inventors: Yukihiro Kaneko; Yoshiharu Ueki; Tuguo Aoki; Takashi Yamamoto; Hideji Nagaya; Yasunao Go, all of Kawagoe, Japan

[73] Assignee: Pioneer Electronic Corporation, Tokyo, Japan

[21] Appl. No.: 863,844

[22] Filed: May 16, 1986

[30] Foreign Application Priority Data

May 18, 1985 [JP] Japan ................... 60-106583

[51] Int. Cl.$^4$ .................................... G11B 15/00
[52] U.S. Cl. ........................... 360/137; 360/71
[58] Field of Search ............. 360/137, 13, 71–72; 369/27, 28

[56] References Cited

U.S. PATENT DOCUMENTS 4,506,309  3/1985  Joannov et al. .......... 360/137
4,688,117  8/1987  Dwyer et al. ............ 360/137

Primary Examiner—John H. Wolff
Attorney, Agent, or Firm—Foley & Lardner Schwartz, Jeffery, Schwaab, Mack, Blumenthal & Evans

[57] ABSTRACT

A method of display control is disclosed for an audio tape deck having a display unit employing an array of light-emitting segments, whereby both data relating to playback audio signals and tape transport data can be selectively displayed in the same display region. Any change in operating status from a normal play mode of operation during display of audio playback signal data is sensed, causing changeover to display of tape transport data, and after a fixed time has elapsed following return to the play mode the display of audio playback signal data is restored.

10 Claims, 24 Drawing Sheets

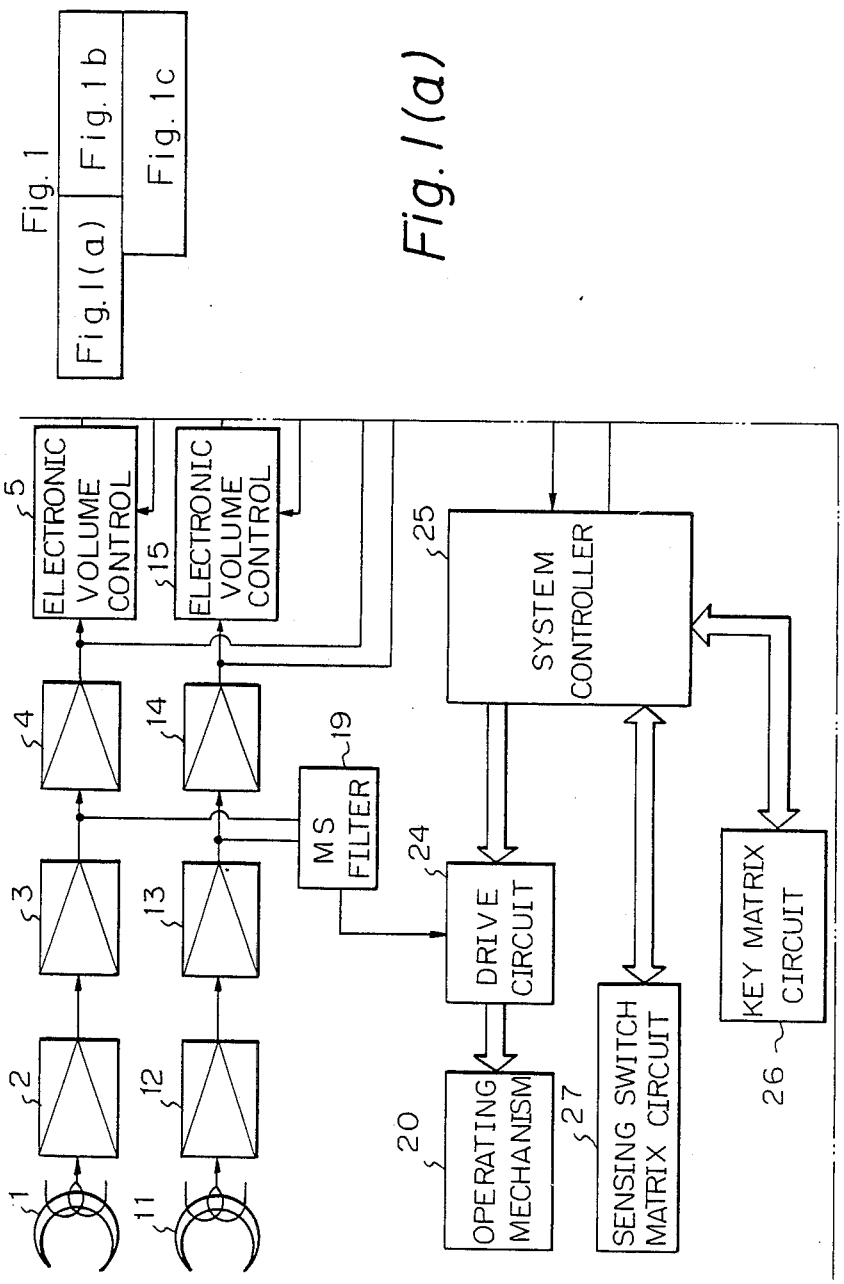

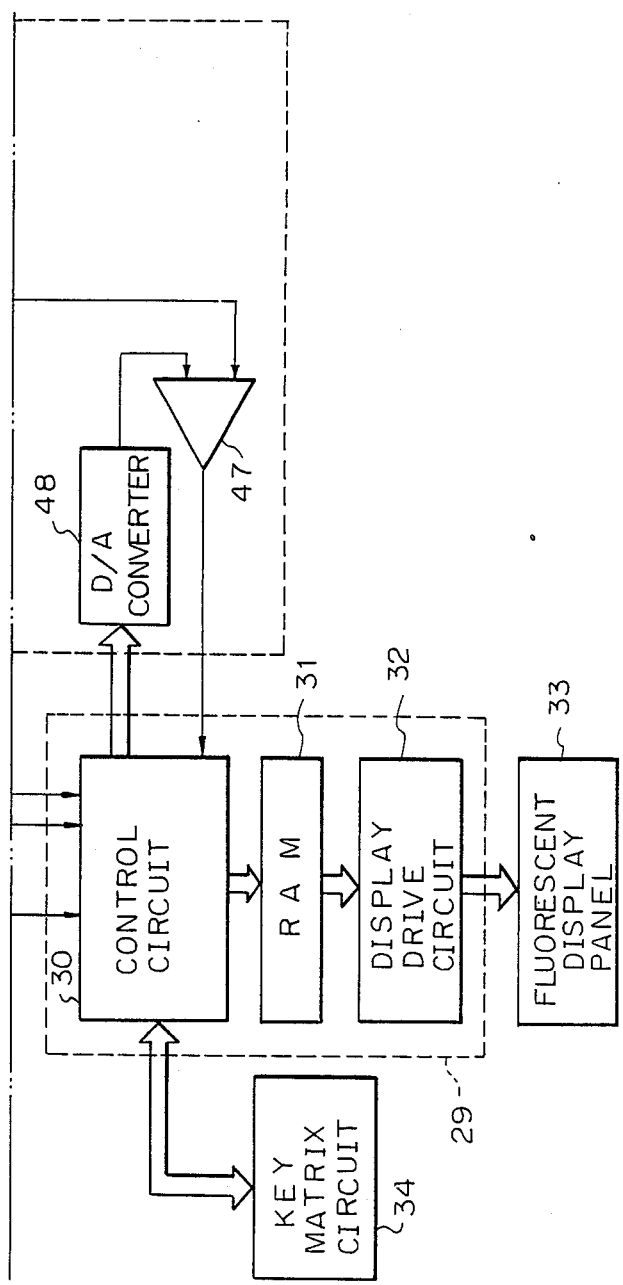

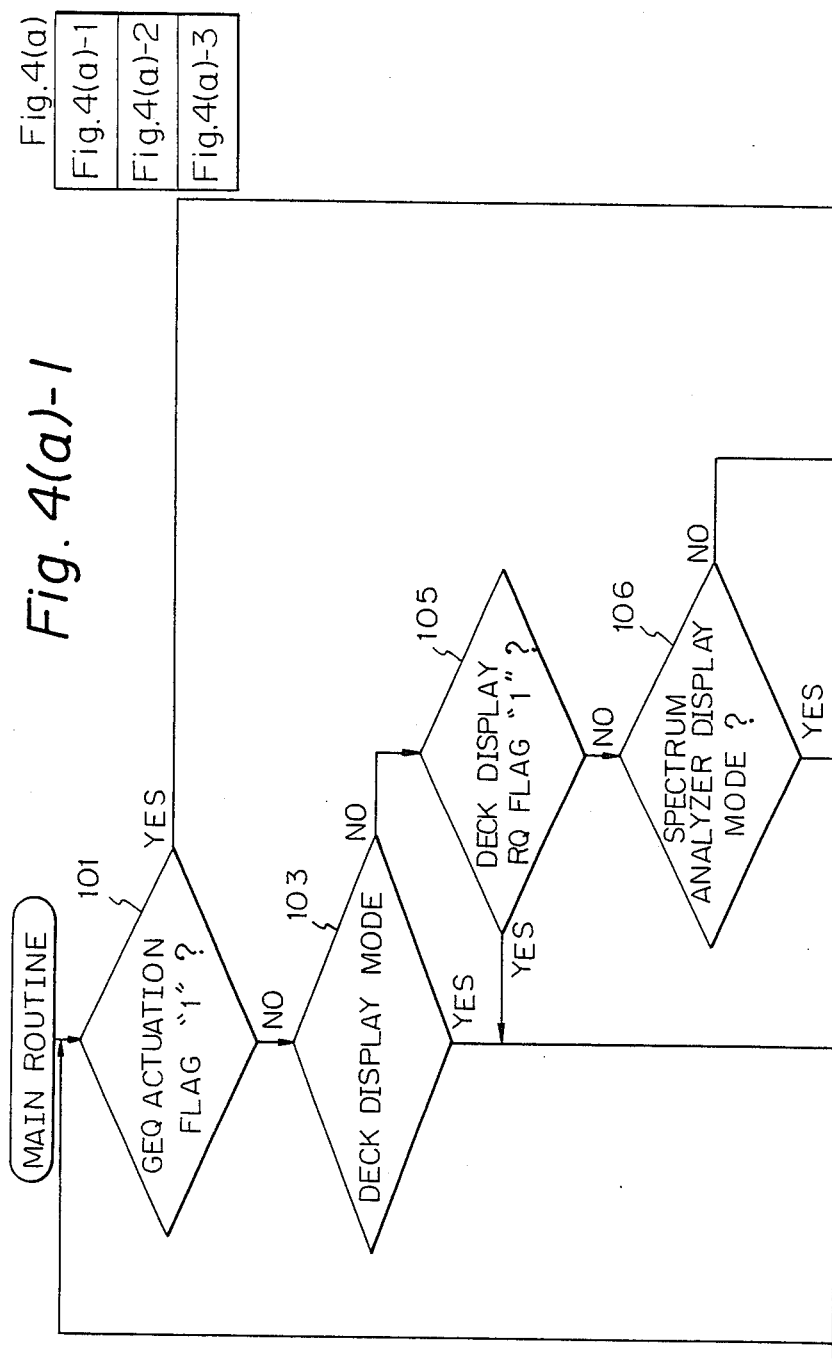

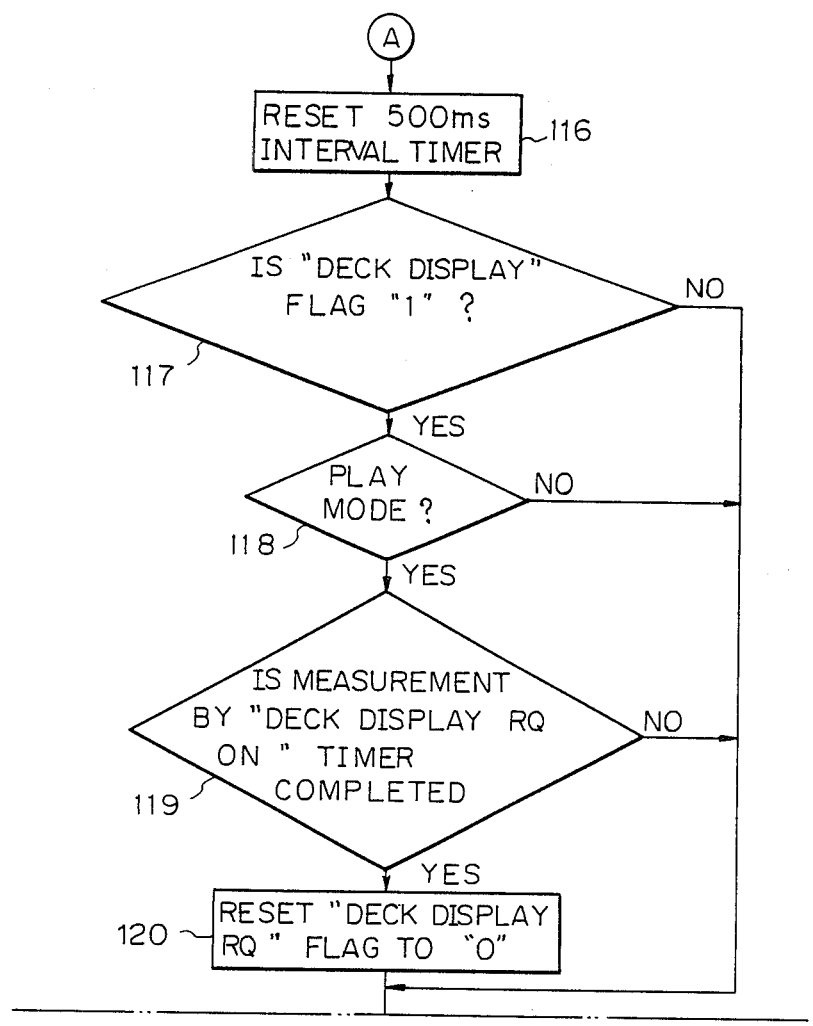

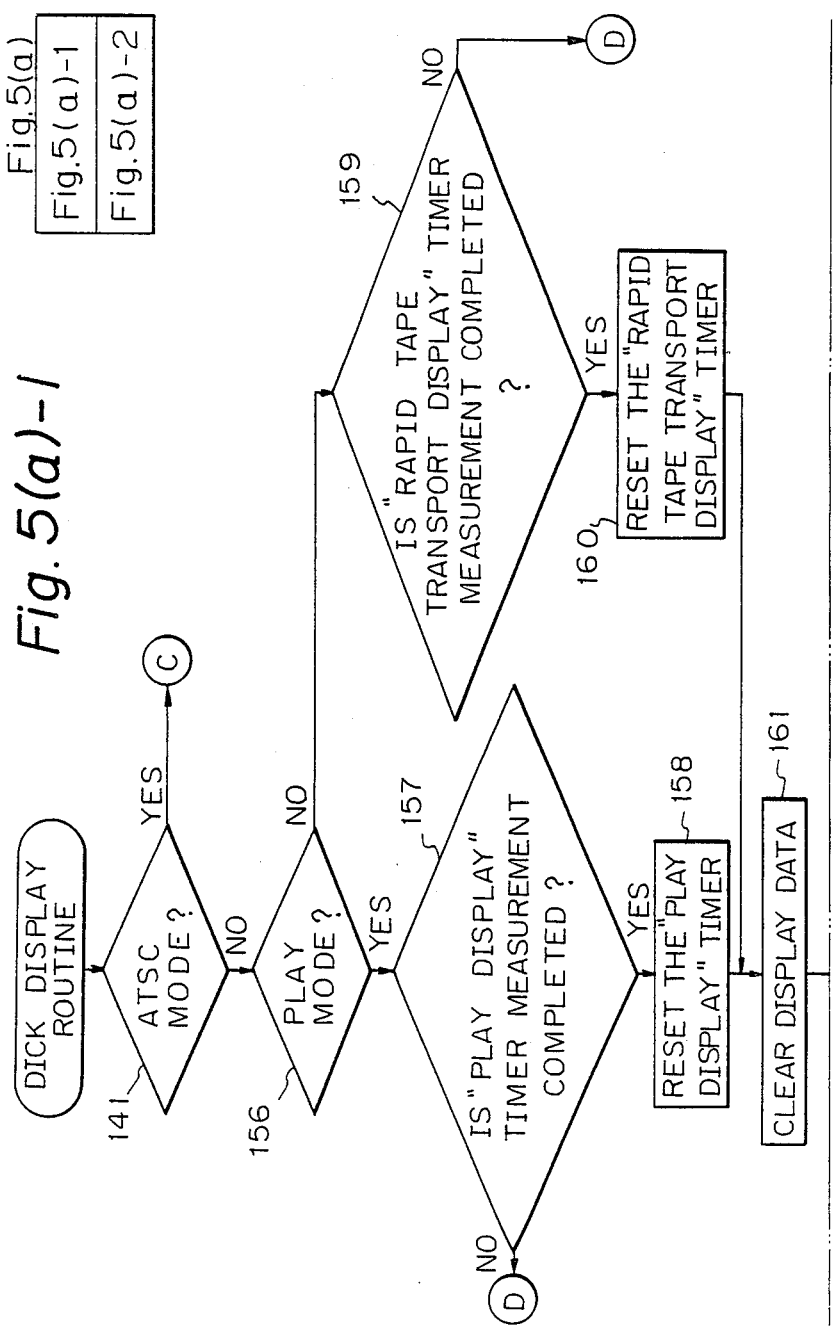

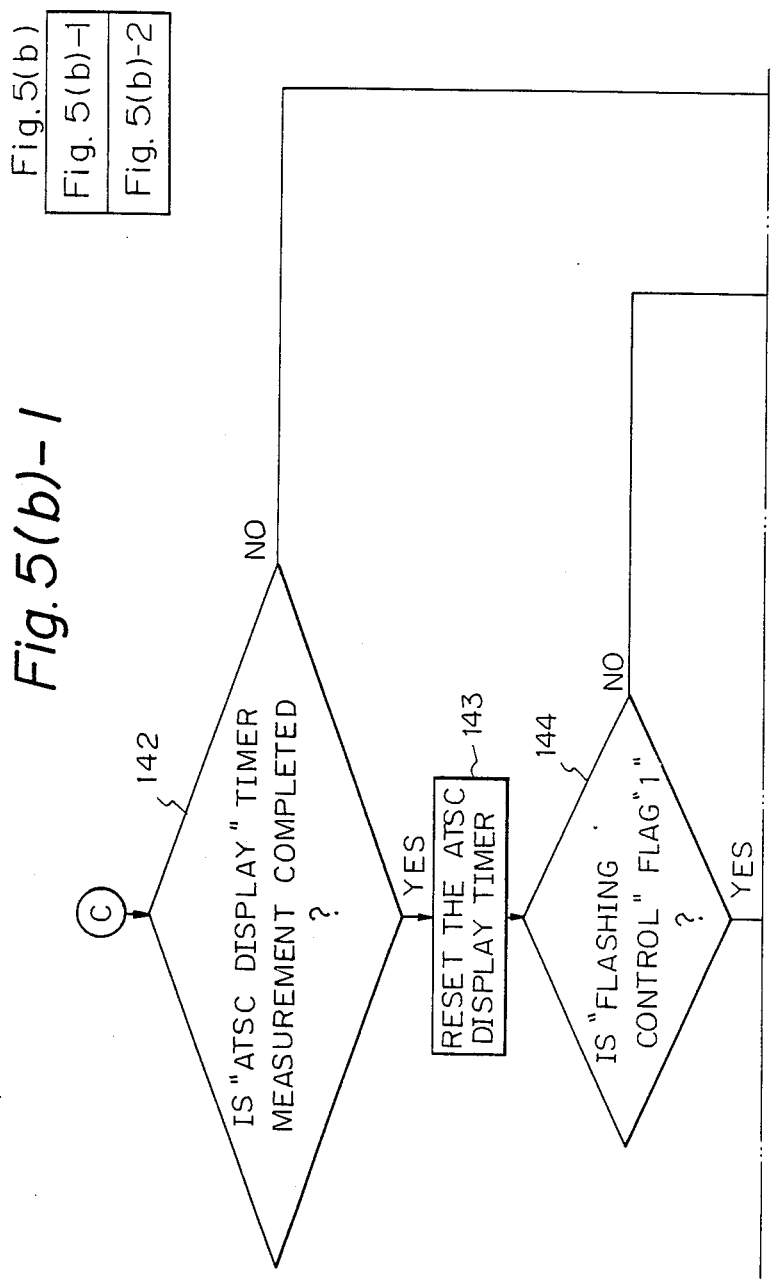

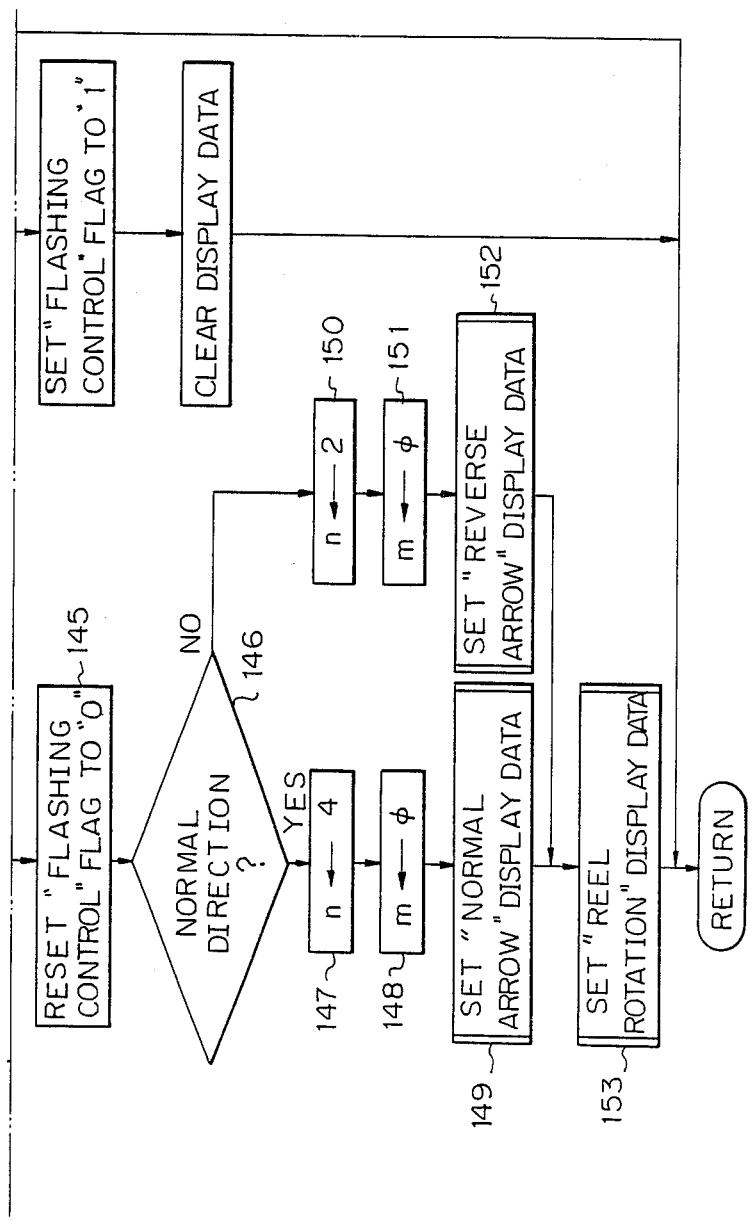

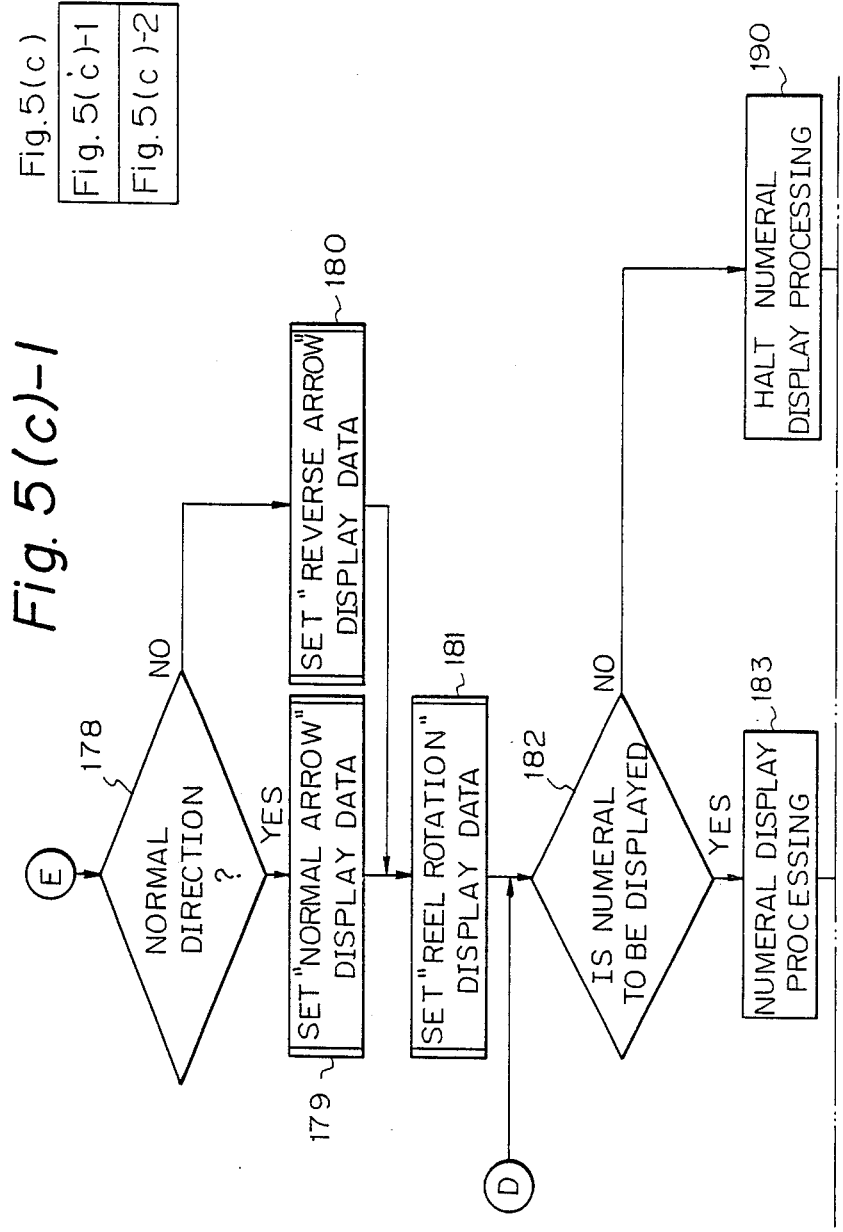

METHOD OF CONTROLLING A TAPE DECK DISPLAY

BACKGROUND OF THE INVENTION

In recent years, audio tape decks for use in vehicles have been produced in which tape transport data, e.g. data indicating the tape transport direction, tape transport speed, etc, and also various items of tape playback audio data such as the audio level, etc, are selectively displayed upon a single display region of a display unit. However with prior art methods of controlling such a display arrangement, serious disadvantages arise. Specifically, when the operating status of the tape deck operating mechanism, and hence the tape transport data, is changed (for example as a result of automatic reversal of the tape transport direction) while audio data is being displayed, no indication will be given on the display of such a change in the the tape transport data contents, and the display of tape audio data is continued. Thus, no indication is given to the user that a change in operating status has occurred, or the nature of this change. This is inconvenient for the user, since with such a prior art display control method it is necessary to perform manual actuations of control switches in order to change from a display of audio signal-related data to a display of tape transport data, and it is desirable to minimize as far as possible the amount of manual operations required for a vehicle-mounted tape deck.

In recent types of vehicle audio tape decks, a spectrum analyzer function is also included whereby frequency analysis of the playback audio signal is performed and the results are displayed in spectrum analyzer form, i.e. as a bar graph display produced on a display panel having a rectangular array of display segments, such as a fluorescent segment display panel. The frequency parameter is measured along the horizontal axis of the display, and signal level is measured along the vertical axis. Such a frequency analyzer display occupies a large part of the control panel of a vehicle tape deck, so that it is difficult to accommodate an additional display region for indicating the operational status data, i.e. for displaying the direction and speed of tape movement, etc. It would therefore be desirable to employ a method of display control for such a tape deck whereby the operating status data could be displayed by the same segment array that is used to display the spectrum analyzer data. Such a control method should also permit various other items of audio playback signal data, such as the audio signal level, to be displayed in place of the spectrum analyzer display when desired.

In addition, such recent types of vehicle audio tape decks also may include a graphic equalizer function, whereby a desired graphic equalizer characteristic can be set by the user, and subsequently memorized, through actuation of switches while observing a graphic equalizer display produced on the aforementioned segment display panel. In order to minimize the amount of operations which must be performed by the user, it would be desirable to provide a method of display control for such a tape deck whereby actuation by the user of any of the switches used in graphic equalizer operation would cause the display of graphic equalizer data to be immediately initiated, and whereby after a predetermined time interval has elapsed following such a graphic equalizer operation switch actuation or any other graphic equalizer operational activity, the data which was being displayed immediately prior to the initiation of the graphic equalizer display would be immediately restored.

SUMMARY OF THE DISCLOSURE

It is an objective of the present invention to provide a method of display control whereby tape transport data is accurately displayed, for a system in which both tape transport data and tape playback audio data are displayable on a single display unit.

More specifically, the present invention comprises a method of display control of a tape deck for selectively displaying upon a single display region of a display unit both tape transport data for indicating an operating status of a drive system of the tape deck and also one of a plurality of audio data items relating to audio signals read out from a magnetic tape whereby, during display of the one of the plurality of tape playback audio data items while the tape deck is operating in a play mode, when it is detected that a change in the drive system operating status has occurred due to a change in operating mode of the tape deck, the display of tape playback audio data is interrupted and the tape transport data is displayed, and whereby after a predetermined time interval following detection that operation in the play mode has been restored, the tape playback audio data for the time point immediately previous to changeover of the deck operating mode is once again displayed.

BRIEF DESCRIPTION OF THE DRAWINGS

FIG. 1 is a block diagram of the manner in which FIGS. 1(a)–1(c) are interconnected.

FIGS. 1(a)–1(c), taken together, represent a block diagram of an example of an audio tape deck to which the display control method of the present invention is applicable;

FIGS. 4(b)-1 through 4(b)-3; FIGS. 5(a)-1 through 5(a)-2; FIGS. 5(b)-1 through 5(b)-2; and FIGS 5(c)-1 through 5(c)-2, respectively.

FIGS. 4(a-1) through 4(a)-3, 4(b)-1 through 4(b)-3, 5(a)-1 through 5(a)-2, 5(b)-1 through 5(b)-2, 5(c)-1 through 5(c)-2, 6, 7, 8, 9, 10(a) and 10(b) are flow diagrams for assistance in describing the control method of the present invention as applied to the tape deck of FIG. 1;

EMBODIMENTS OF THE INVENTION

Figure 1B:
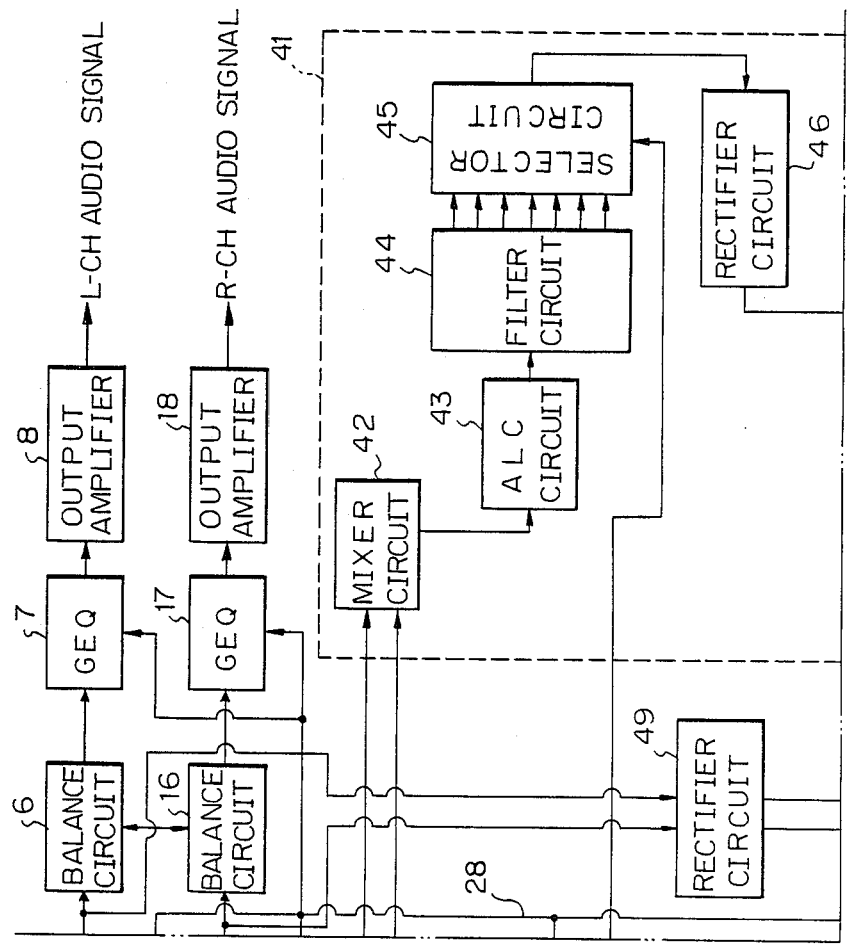

The application of the display control method of the present invention to an example of a tape deck will now be described, referring to the drawings. FIG. 1(a) through 1(c) are block diagrams of a vehicle-mounting tape deck to which the display control method of the present invention is applicable. FIG. 1 illustrates the manner of interconnection of FIGS. 1(a)–1(c). With this tape deck, a L-ch (left-channel) audio signal read out from a magnetic tape by a playback head 1 is passed through a playback equalizer 2, a NR (noise reduction) circuit 3, an amplifier 4, an electronic volume control 5, a balancing circuit 6, a GEQ (graphic equalizer) circuit 7, and an output amplifier 8. Similarly, an R-ch (right-channel) audio signal read out by a playback head 11 is passed through a playback equalizer 12, a NR circuit 13, an amplifier 14, an electronic volume control 15, a balancing circuit 16, a GEQ circuit 17, and an output amplifier 18.

Figure 2:
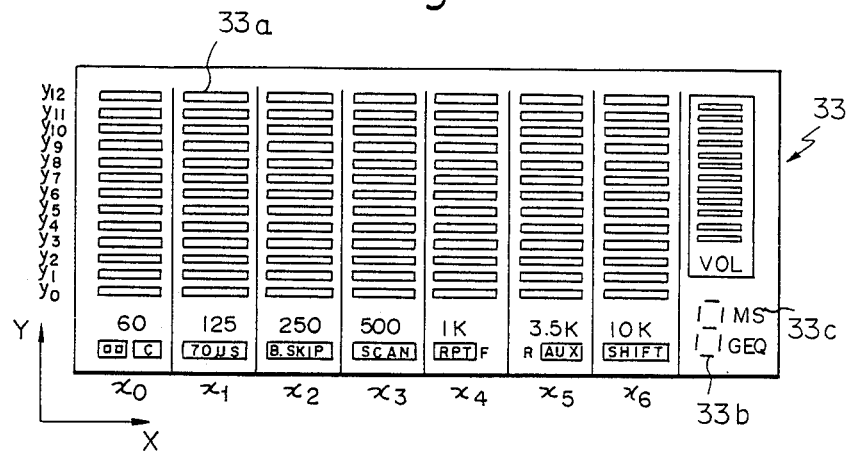
FIG. 2 is a view in elevation of a fluorescent display panel of the tape deck in FIG. 1.

Reference numeral 20 denotes an operating mechanism for driving two reels of magnetic tape contained in a tape cassette, a capstan, playback heads 1 and 11, etc. The operating mechanism 20 includes a capstan drive motor and an operating mechanism switching motor which are driven by a drive circuit 24, controlled by a system controller 25. The system controller 25 includes a microprocessor. A sensing switch matrix circuit 27 is coupled to the system controller 25, for detecting when a tape cassette is moved into and moved out of a predetermined position. In addition, a key matrix circuit 26 is coupled to system controller 25. Key matrix circuit 26 includes a plurality of key switches, which are actuatable by the user for inputting commands to control various operations by the tape deck. In addition, the system controller 25 is coupled through a data line 28 to electronic volume controls 5 and 15, and to graphic equalizers 7 and 17, and also to a display controller 29. The display controller 29 includes a control circuit 30, a RAM (random access memory) 31, and a display drive circuit 32, and controls the lighting of fluorescent display panel 33. As shown in FIG. 2, the fluorescent display panel 33 includes a segment display section 33a which consists of a rectangular array of 7 groups of segments arrayed in 7 successive positions (X0 to X6) along the horizontal axis (X-direction), with each of these groups of 7 segments consisting of 13 (Y0 to Y12) horizontally elongated fluorescent display segments extending along the vertical axis (Y-direction).

The addresses of memory locations in RAM 31 correspond to respective display segments of display section 33a. In the following, the position of each segment of display section 33a, and the corresponding RAM memory address, will be expressed as X-Y coordinates in terms of the coordinate values Y0 to Y12 and X0 to X6 shown in FIG. 2. When a logic "1" is written into a memory location $M(X_p, Y_q)$ designated by address $(X_p, Y_q)$, by control circuit 30, then this results in the display segment $(X_p, Y_q)$ corresponding to the address $(X_p, Y_q)$ being driven to the ON state, i.e. the light-emitting state, by display drive circuit 32. The control circuit 30 of this embodiment is based on a microprocessor, and is coupled to a key matrix circuit 34 which includes a plurality of key switches, for use in controlling various operations. The key matrix circuit 34 is separate from key matrix circuit 26.

A frequency analyzer circuit 41 is connected to the outputs of amplifiers 4 and 14, and is made up of a mixer 42, for mixing the output signals from amplifiers 4 and 41, an ALC (automatic level control) circuit 43, for controlling the level of signal which is output from the mixer circuit 42, a filter circuit 44 made up of 7 BPFs (band-pass filters) having respectively differing center frequencies (i.e. 60, 125, 250, 500, 1K, 3.5K and 10K (Hz)) and which are coupled to receive the output signal from ALC 43, a selector circuit 45 for selecting one of the BPF outputs from filter circuit 44 in accordance with a selection signal which is applied thereto from the system controller 25, a rectifier circuit 46 for rectifying the output signal from selector circuit 45 to produce a DC signal, and a comparator 47 for comparing this DC signal level with a reference level. The output signal from comparator 47 is supplied to the control circuit 30. Control circuit 30 produces reference level data for use by comparator 47, this data being converted by a D/A converter 48 into an analog signal to be used as a reference level, which is applied to one input of comparator 47.

A rectifier circuit 49 serves to rectify the output signals from the electronic volume controls 5 and 15 to produce corresponding rectified output signals. These signals, which represents the current levels of the R-ch and L-ch playback audio signal, are supplied as level display signals to the control circuit 30. Control circuit 30 classifies these R-ch and L-ch rectified signals into respective values $L_L$ and $L_R$, each of which is within the range 0 to 6.

Figure 3:
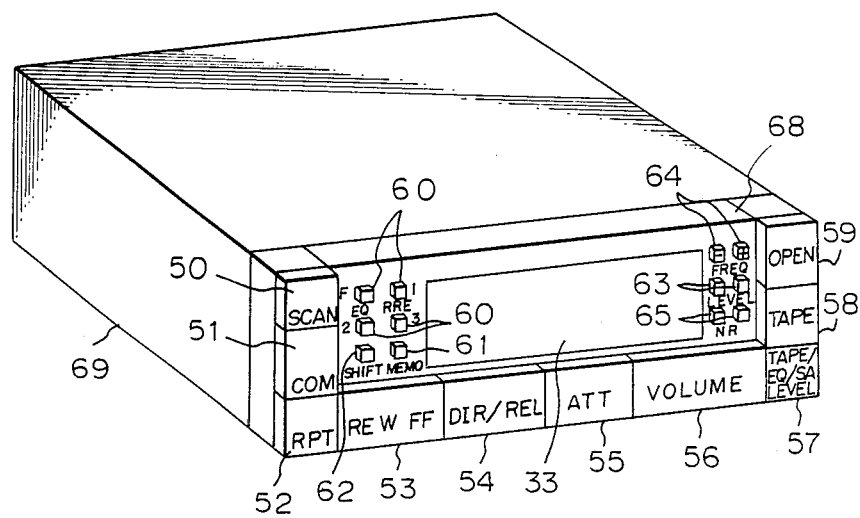
FIG. 3 is an oblique external view of the tape deck of FIG. 1.

FIG. 3 is an external oblique view of the tape deck of FIG. 1. In FIG. 3, numeral 50 denotes a MUSIC SCAN key, which is actuatable for successively playing the initial portions of different musical items. Numeral 51 denotes a command key, for designating a number of musical items which are to be skipped over when the tape deck is operating in the MS (music selection) mode. Numeral 52 denotes a review key, for executing repetition of playing a musical item. Numeral 53 denotes a FF/REW key, which is operable to produce rapid tape transport in the forward (FF) or rewind (REW) direction, i.e. for setting the tape deck in a rapid tape transport mode. Numeral 54 denotes a release key, which is operable for executing changeover of the tape transport direction from the normal direction to the reverse direction, or from the reverse direction to the normal direction, when the tape deck is operating in the PLAY mode. Release key 54 is also used to terminate operation in the MS mode or in a rapid tape transport mode, etc. Numeral 55 denotes an attenuator key, and numeral 56 denotes a volume up/down key, for designating the level of gain produced by the electronic volume controls 5 and 15. Numeral 57 denotes a display changeover key, for executing changeover of the display mode of segment display section 33a, i.e. for selecting either display of tape transport data as described hereinafter, or display of equalizer or spectrum analyzer data. Numeral 58 denotes a tape power key, for halting playing operation. Numeral 59 denotes an open/eject key, for executing removal of a tape cassette. Numeral 60 denotes EQ-PRESET keys, for selecting the equalizer characteristics which are produced by GEQ 7 and 17. Numeral 61 denotes a MEMO key, for executing memorizing of a specific equalizer characteristic, which has been established by actuations of the EQ/PRESET keys 60, in a memory (not shown in the drawings). Numeral 62 denotes a SHIFT key, for enabling selection of equalizer characteristics by means of the EQ-PRESET keys 60. Numeral 63 denotes LEVEL (+,−) keys, for level adjustment to produce a desired equalizer characteristic. Numeral 54 denotes a FREQUENCY (+,−) key, used to select a frequency bandwidth within which level adjustment by means of the LEVEL (+,−) keys 63 can be performed. Numeral 65 denotes a NR key, for selecting the characteristics of the NR circuits 3 and 13.

The keys 53 through 56, 60 through 65, and the fluorescent display panel 33 are mounted on a flap member 68, which is rotatably mounted with respect to the housing 69, and is rotated by actuation of the OPEN-/EJECT key 59 to thereby enable access through the front of the tape deck into a tape cassette insertion aperture (not shown in the drawings).

Keys 50 through 52, and 57 through 59 are coupled to the key matrix circuit 26, while keys 53 through 56 and 60 through 65 are coupled to the key matrix circuit 34.

When a tape cassette is inserted through the tape cassette insertion aperture into the interior of the tape deck, a tape cassette insertion sensing switch (not shown in the drawings) is actuated. This actuation is detected by a scanning operation performed by the sensing switch matrix circuit 27, and is thereby notified to the system controller 25. The system controller 25 then issues a tape cassette loading command to the drive circuit 24, whereupon drive circuit 24 operates the operating mechanism 20 in accordance with the tape cassette loading command, to load the tape cassette into a predetermined position within the interior of the tape deck. When the tape cassette has been loaded, a tape cassette loading detection sensing switch (not shown in the drawings) is actuated, and this actuation is sensed by the scanning operation performed by the sensing switch matrix circuit 27, and hence the cassette loading operation is notified to the system controller 25. The system controller 25 responds to this detection of loading by issuing a "slack take-up" command to the drive circuit 24, for initiating operation in the ATSC (automatic tape slack take-up) mode, to take up any slack in the tape. As a result, the drive circuit 24 operates the operating mechanism 20 such as to rotate the tape supply reel to take up any slack in the tape. When the tape slackness has been completely removed, then the take-up reel is rotated, and this rotation is detected by system controller 25 from the output signal of a take-up reel rotation sensor. The system controller 25 thereby senses the completion of slackness take-up. Upon termination of the ATSC mode, the play mode is entered, i.e. the operating mode in which playback of music from the tape is performed. System controller 25 thereupon issues a play command to the drive circuit 24, which responds by driving the operating mechanism 20 to transport the tape at a fixed speed and also to move the playback heads 1 and 11 into close contact with the tape. As a result, the playback heads 1 and 11 respectively perform read-out of audio signals, whereupon an L-ch audio signal is produced from output amplifier 8 and an R-ch audio signal is produced from output amplifier 18.

During operation in the play mode, if the FF/REW key 53 of the key matrix circuit 34 is actuated, then as a result of the scanning operation by the key matrix circuit 34, control circuit 30 senses the ON state of the FF/REW key and supplies communication data indicating this ON status of that key, through data line 28 to the system controller 25. Upon receiving this FF/REW key ON data, the system controller 25 changes the operating mode from the play mode to the rapid tape transport mode. When this mode transition occurs, the system controller 25 issues either a FF rapid tape transport command or a REW rapid tape transport command to drive circuit 24. Drive circuit 24 responds to this command by driving the operating mechanism 20 to transport the tape at high speed in a corresponding direction.

The system controller 25 and the display controller 29 mutually exchange 8-bit communication data over data line 28, at fixed periodic intervals, by interrupt processing. The data supplied from the display controller 29 to the system controller 25 consists of a command bit portion and a control bit portion. The command bit portion identifies the keys of key matrix circuit 34 which have been set to the ON state, while the control bit portion consists of data designating reset of the system controller 25, data requesting generation of a "beep" sound (such a request being issued each time a key of the key matrix circuit 34 is actuated), or data indicating the reception of a command bit portion sent from the system controller 25. The data which is supplied from the system controller 25 to the display controller 29 consists of a command bit portion, a control bit portion, and a frequency bit portion. The command bit portion designates the inititation of deck display, GEQ display, level display, spectrum analyzer display, etc. The control bit portion designates reset of the display controller 29, etc. The frequency bit portion expresses the center frequency of a band-pass filter selected by selection circuit 45 during spectrum analyzer display operation. During deck display operation, i.e. operation in which data relating to the tape transport status of the tape deck is displayed, the command bit portion of the data sent from the system controller 25 also includes 3×8 bits of display data which designates initiaiton of the ATSC mode, play mode, rapid tape transport mode, FF/REW, tape transport direction, MS mode, and the number of musical items to be skipped over during MS mode operation.

The positions of the playback heads 1 and 11 differ depending upon the tape transport direction. Each head is set in one position for the normal tape transport direction, in which heads 1 and 11 contact a tape surface at one side of the tape, and another position for the reverse tape direction, in which the heads contact the opposite side of the latter tape surface. The transport direction is sensed by means of a tape transport direction sensing switch within sensing switch matrix circuit 27, which is coupled to the playback heads 1 and 11.

The command bit portion of the control data supplied from the system controller 25 to display controller 29 is rewritten each time the changeover switch 57 is actuated. For example, the command bit portion might be rewritten in the sequence: deck display, GEQ display, level display, spectrum analyzer display.

Figures 2, 4A:
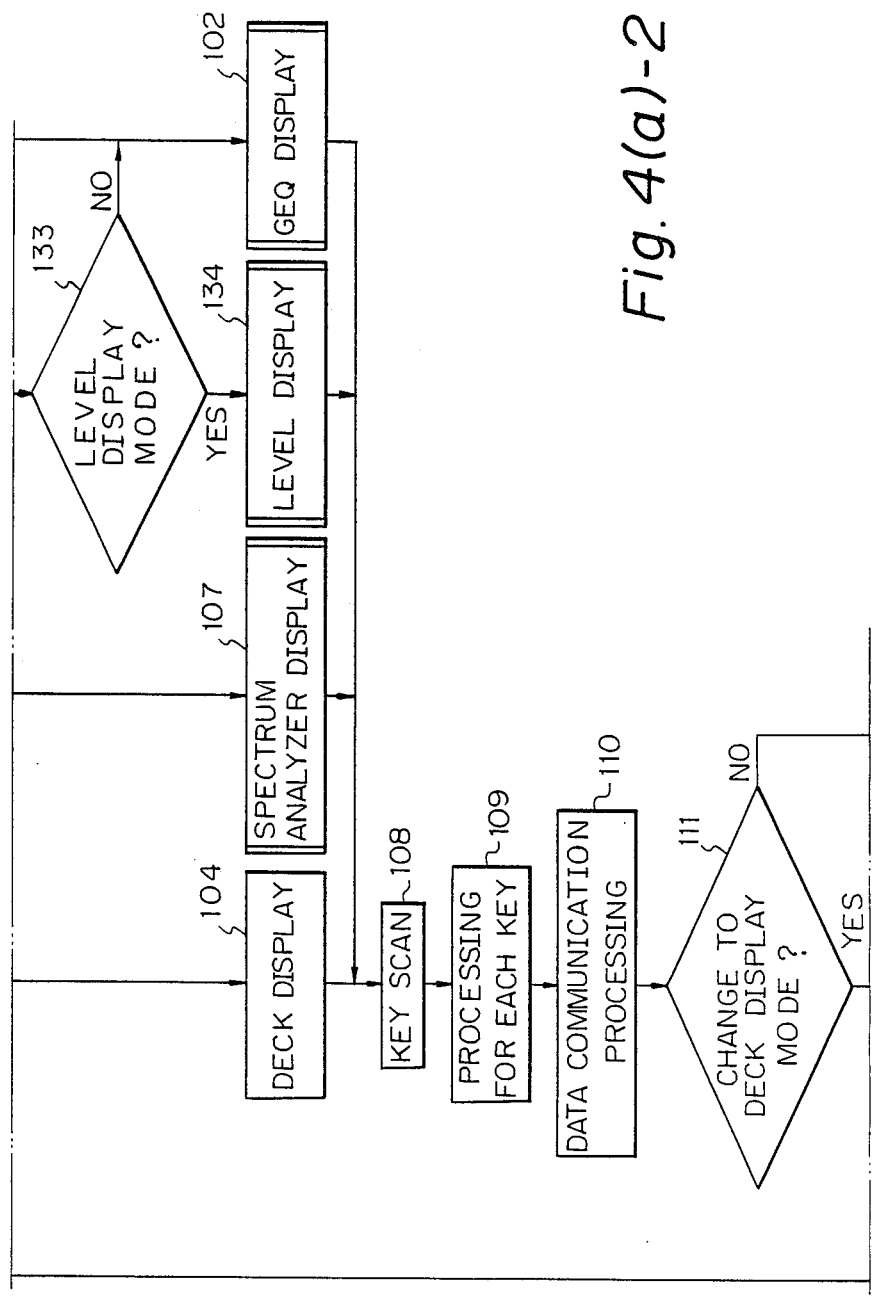
FIGS. 4(a); 4(b); 5(a); 5(b); 5(c) are block diagrams of the manner of interconnection of FIGS. 4(a)-1 through 4(a)-3.
Figures 3, 4A:
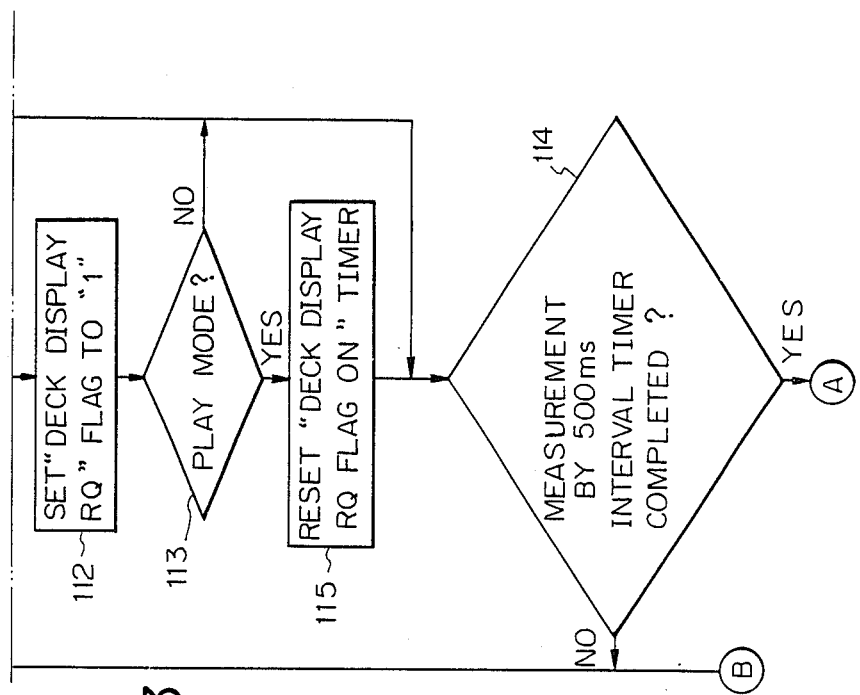
Figures 2, 4B:
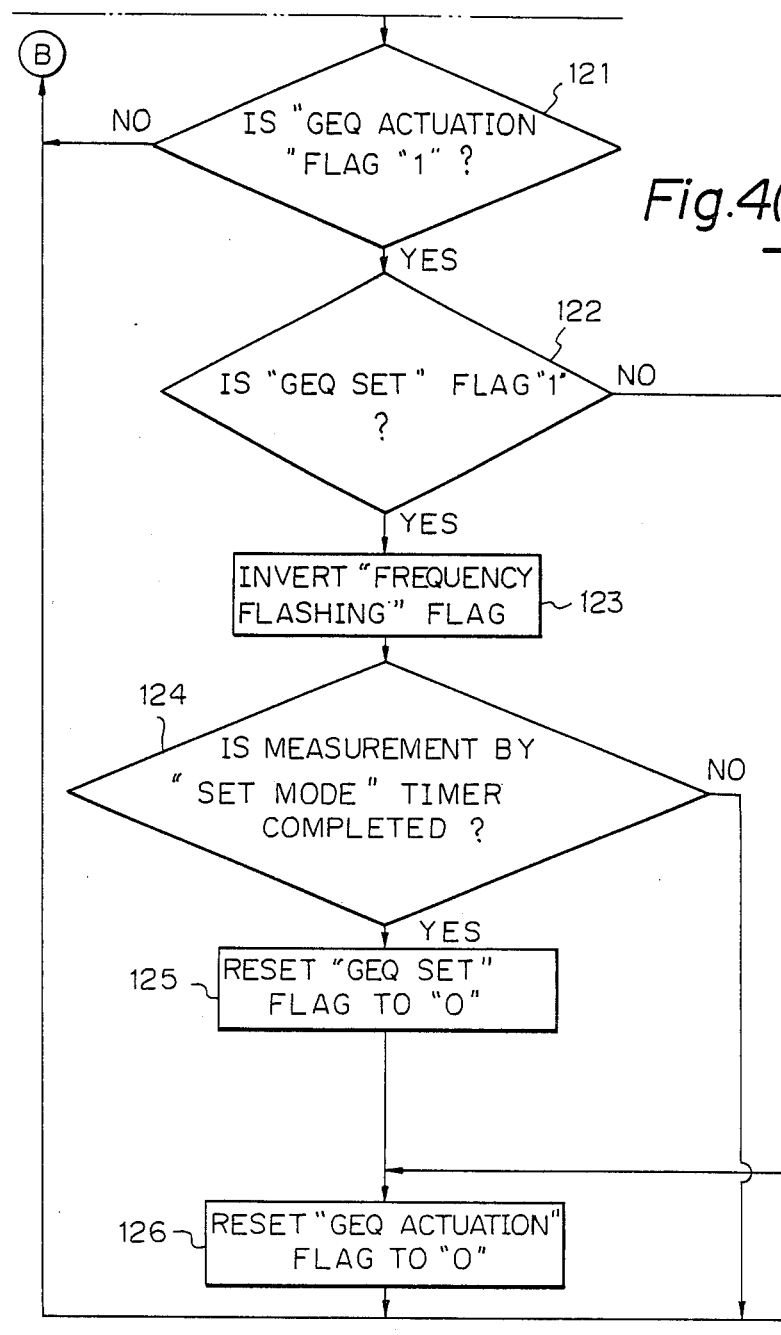
Figures 3, 4B:
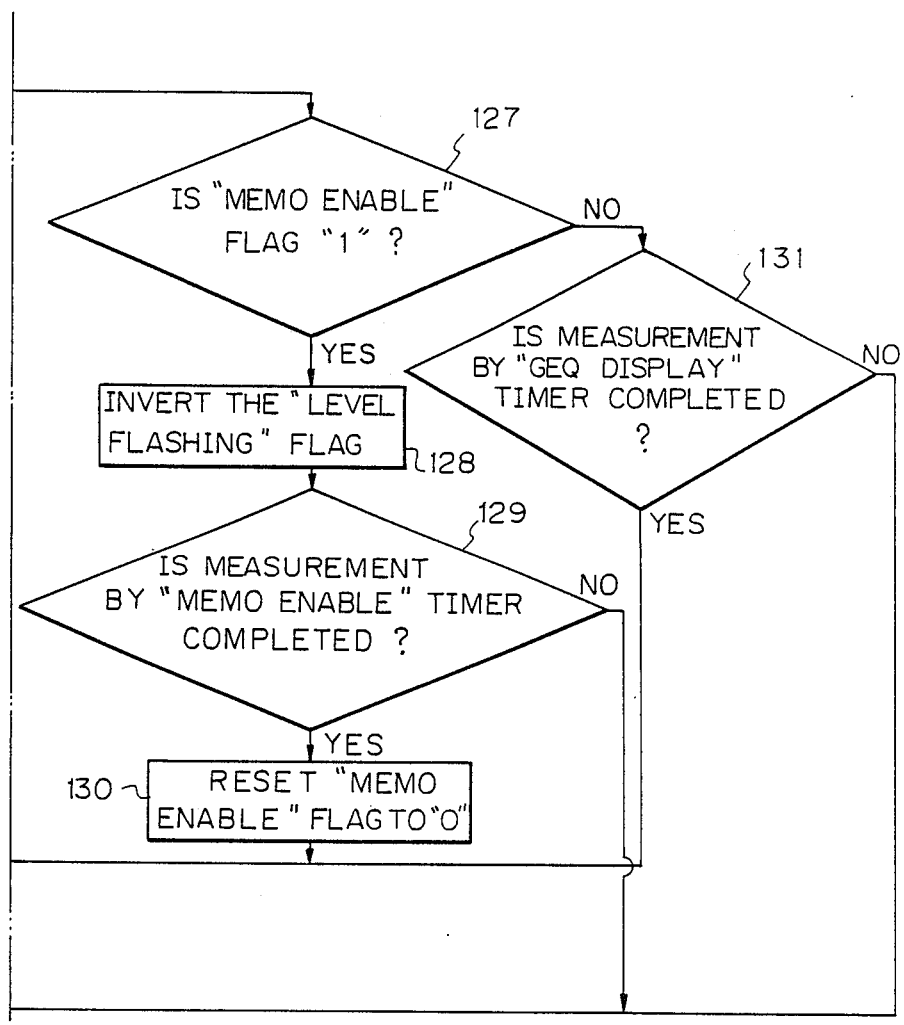
Figure 8:
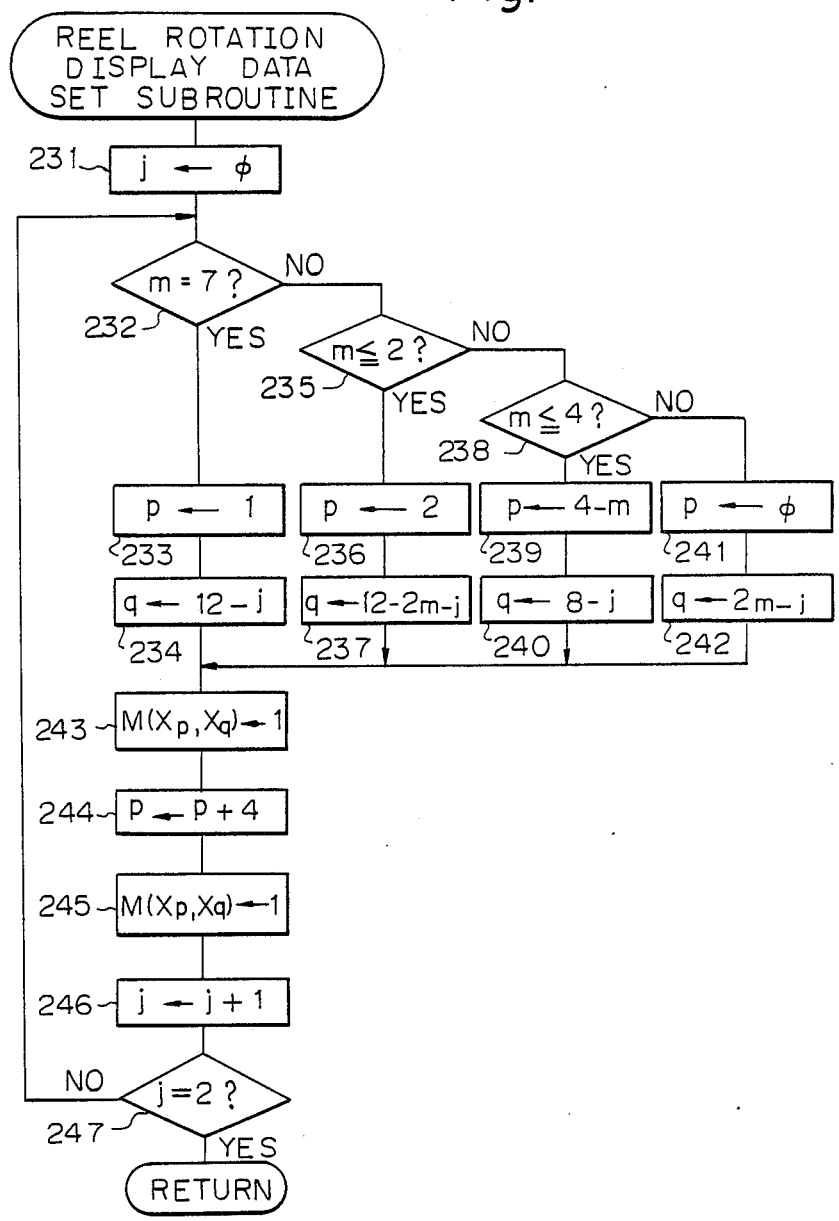
Figure 9:
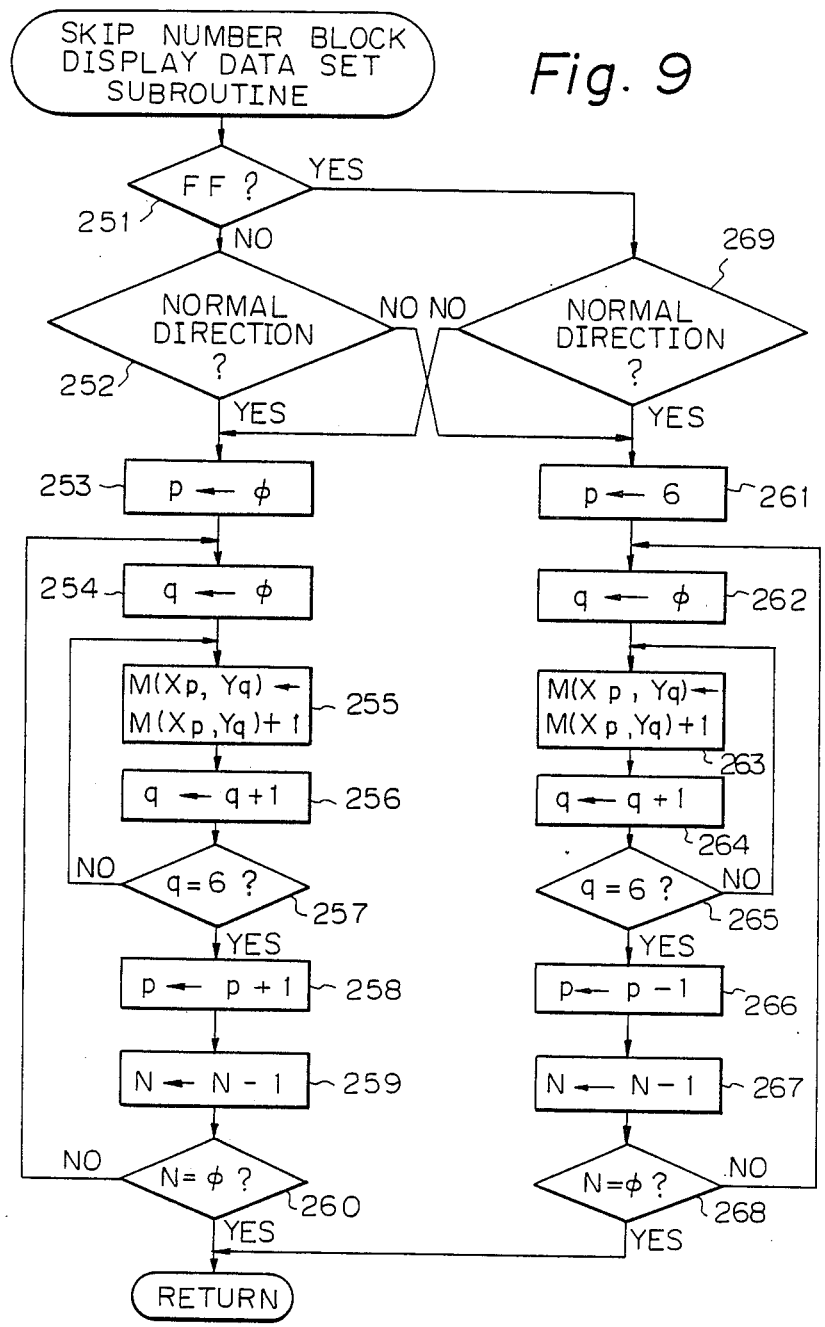
Figure 10A:
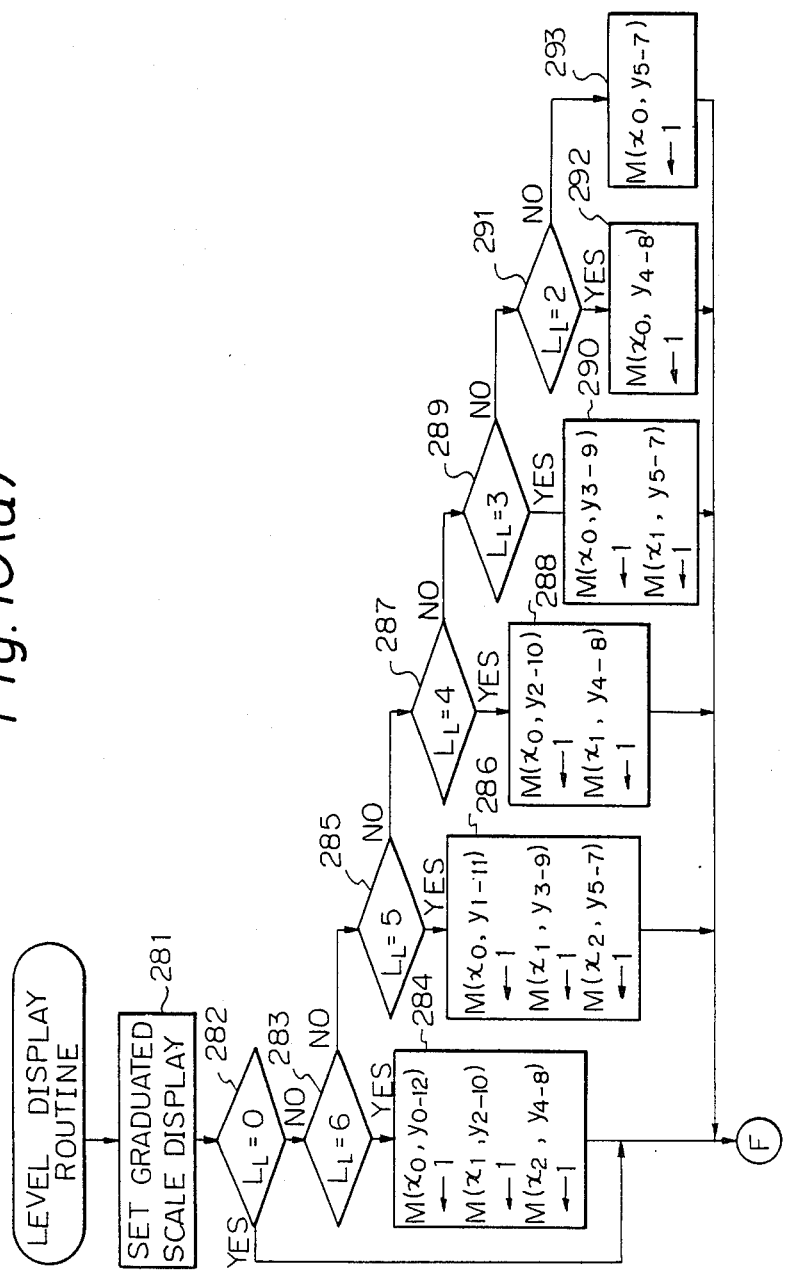

The sequence of display operations by this embodiment of the invention executed by control circuit 30 will be described with reference to the operating block diagrams of FIGS. 4 through 10. Control circuit 30 repetitively executes a main routine, shown in the flow diagram of FIGS. 4(a)-1 through 4(a)-3, at timings determined by a clock signal. FIG. 4(a) illustrates the interconnection of FIGS. 4(a)-1 through 4(a)-3. In this main routine, the system first judges whether or not the "GEQ actuation" flag F1 is in the logic "1" state (step 101). This is a flag which is set to the "1" state in response to actuation of the EQ-PRESET (F, 1, 2, 3) keys 60, the SHIFT key 62, the FREQUENCY (+,−) keys 64, the LEVEL (+,−) keys 63, or the MEMO key 61. If this GEQ actuation flag is in the "1" state, then the GEQ display routine is executed (step 102). If the "GEQ actuation" flag F1 is in the "0" state, then the system judges whether or not the display operating mode is the deck display mode (step 103). This judgement is made based on the command bit portion of the control data which is supplied from the system controller 25. If operation is in the deck display mode, then as shown in FIG. 5, the deck display routine is executed (step 104). If operation is not in the deck display mode, then a decision is made as to whether the "deck display RQ" flag F2 is in the "1" state. This is a flag which is set to the "1" state when the operating status of the operating mechanism 20 is changed to shift to the deck operation mode. If flag F2 is in the "1" state, then the deck display routine is executed (step 104). If flag F2 is in the "0" state, then a decision is made as to whether the display operating mode is the spectrum analyzer display mode (step 106). If operation is in the spectrum analyzer display mode, then the spectrum analyzer display routine is executed (step 107). If operation is not in the spectrum analyzer display mode, then a decision is made as to whether the level display mode is established (step 133). If the level display mode is established, in which the levels of the L-ch and R-ch audio signal levels are displayed, then the level display routine shown in FIG. 10(a) is executed (step 134). If the level display mode has not been entered, then the graphic equalizer display routine is executed (step 102).

When the deck display routine, span display routine, level display routine or graphic equalizer display routine is executed, a key scan is performed by key matrix circuit 34 (step 108). If it is detected that a key has been actuated, then processing is performed for that key (step 109). In this processing, if it is detected that any of the EQ-PRESET (F, 1, 2, 3) keys 60 or the SHIFT key 62 has been actuated, then "GEQ actuation" flag F1 is set to the "1" state, while the "GEQ display" timer A1 is reset. If on the other hand it is detected that any of the FREQUENCY (+,−) keys 64 or the LEVEL (+,−) keys 63 has been actuated, then the "GEQ actuation" flag F1 and the "GEQ set" flag F3 are set to the "1" state, while the "set mode" timer A2 is reset. If it is detected that the MEMO key 61 has been actuated, then the "GEQ actuation" flag F1 and the MEMO enable flag F4 are set to the "1" state, while the "MEMO enable" timer A3 is reset. After executing step 109, control data processing is performed. Specifically, control data is generated, to be supplied to the system controller 25, while processing of control data supplied from system controller 25 is performed (step 110). Next, a decision is made as to whether the operating status of the operating mechanism 20 is to be changed to enter the deck operating mode (step 111). This judgement is made based on the display data which is supplied from the system controller 25. If the operating status of the operating mechanism 20 is to be changed to enter the deck operating mode, then the deck display RQ flag F2 is forcibly set to the "1" state (step 112), and a decision is made as to whether the play mode has been entered (step 113). If the play mode has not been entered, then a decision is made as to whether the time interval measured by the 500 ms interval timer A4 has elapsed (step 114). If the play mode has been entered, then the "deck display RQ" flag F2 is reset (step 115), and step 114 is executed. If on the other hand it is judged in step 111 that the operating status of the operating mechanism 20 has not been changed to initiate the deck operating mode, then step 114 is immediately executed. In step 114, if measurement by the 500 ms interval timer A4 is found to be in progress, then step 101 is executed to change to the deck display mode from another display mode. If measurement by timer A4 has ended, then timer A4 is reset (step 116, FIG. 4(b)-1), and a decision is made as to whether the "deck display RQ" flag F2 is in the "1" state (step 117). If "deck display RQ" flag F2 is in the "1" state, then a decision is made as to whether the play mode has been entered (step 118). If operation is in the play mode, then the system again judges whether the time interval measured by ""deck display RQ" flag on" timer A5 has elapsed (step 119). If that time interval has elapsed, then the "deck display RQ" flag F2 is reset to the "0" state, to return operation to the display mode immediately prior to entering the deck display mode (step 120). A decision is then made as to whether the "GEQ actuation" flag F1 is in the "1" state (step 121, FIG. 4(b)-2). If it is found in step 117 that flag F2 is in the "0" state, it has been judged in step 118 that the play mode has not been entered, or if it is judged in step 119 that time measurement by the ""deck display RQ" flag on" timer A5 is still in progress, then step 121 is immediately executed, in order to continue the deck display operation. In step 121, if flag F1="0", then step 101 is executed, while if F1="1", then a decision is made as to whether the "GEQ set" flag F3 is in the "1" state (step 122). If it is judged that flag "GEQ set" flag F3 is in the "1" state, as a result of any of the FREQUENCY (+,−) keys 64 or the LEVEL (+,−) keys 63 having been actuated, then the operating status is been established whereby the characteristics of GEQ7 and GEQ 17 can be preset. The "frequency flashing" flag F5 is therefore inverted (step 123), to produce display of the bandwidth within which level adjustment can be performed, then a decision is made as to whether the time measured by the "set mode" timer A2 has elapsed (step 124). After it is detected that one of the FREQUENCY (+,−) keys 64 or the LEVEL (+,−) keys 63 has been actuated, then after a predetermined time interval T2 (for example 10 seconds) has elapsed without actuation of these keys, i.e. the time interval measured by the "set mode" timer A2, the "GEQ set" flag F3 is reset to the "0" state to produce a change from the graphic equalizer display mode to another display mode (step 125). The "GEQ actuation" flag F1 is then reset to the "0" state (step 126), and step 101 is executed once more. If measurement by the "set mode" timer A2 is still in progress, then step 101 is executed to continue the graphic equalizer display mode. If on the other hand it is judged in step 122 that flag F3 is in the "0" state, then a decision is made as to whether the "MEMO enable" flag F4 is in the "1" state (step 127, FIG. 4(b)-3). If F4="1", as a result of actuation of the MEMO key 61, then the "level flashing" flag F6 is inverted (step 128) in order to produce flashing of the graphic equalizer level display for each of the frequency bands, and a decision is made as to whether the time measured by "MEMO enable" timer A3 has elapsed (step 129). If it is detected that the MEMO key 61 has been actuated, then after a predetermined time interval T3 (for example, 5 seconds) has elapsed, as measured by the "MEMO enable" timer A3, the "MEMO enable" flag F4 is reset to "0" (step 130), to implement transfer from the graphic equalizer display mode to another display mode. Step 126 is then executed. In step 127, if it is found that flag F4 is at "0", then a decision is made as to whether the interval measured by "GEQ display" timer A1 has elapsed (step 131). If it is detected that any of the EQ-PRESET (F, 1, 2, 3) keys 60, or the SHIFT key 62 has been actuated, then when a predetermined time interval (for example 5 seconds) has elapsed, as measured by the "GEQ display" timer A1, step 126 is executed to execute transfer from the graphic equalizer display mode to another display mode. If on the other hand measurement by the "GEQ display" timer A1 is still in progress, then step 101 is executed, to continue the graphic equalizer display mode.

It can thus be understood from the above that when the user desires to initiate the graphic equalizer mode, this can be done by actuating any of the switches which are used in the graphic equalizer setting or memorization operations. The user can then set a desired graphic equalizer characteristic by switch actuations. Thereafter, after a predetermined time interval has elapsed, automatic restoration of the display of playback audio data or tape transport data being displayed at the time of changeover to the graphic equalizer mode will be executed, without the need for further intervention by the user. In this way, the amount of manual intervention required to enter and to exit from the graphic equalizer mode is minimized as far as possible.

Figure 7:
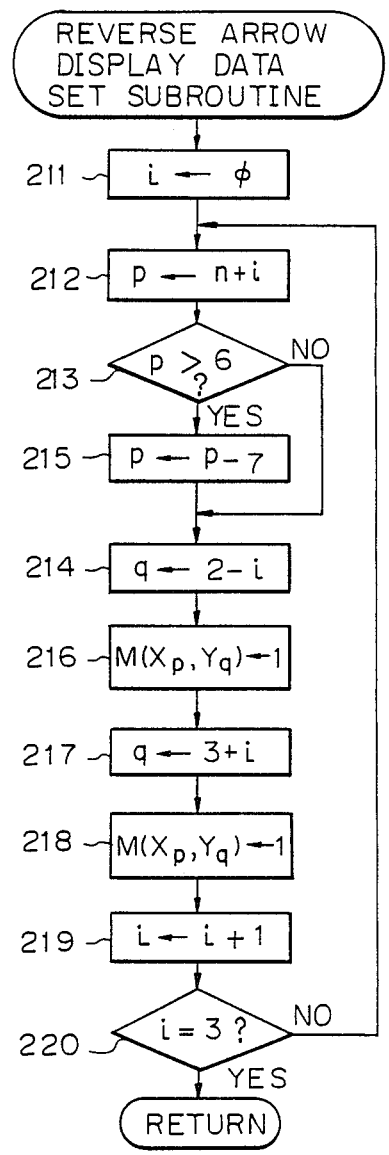

The deck display routine will now be described, referring to FIG. 5 and FIGS. 5(a)-1 and 5(a)-2. Firstly, a decision is made as to whether the ATSC mode has been entered (step 141). If it is judged, based on the control data sent from the system controller 25 that the ATSC mode has been entered, then a decision is made as to whether the time measured by the "ATSC display" timer A11 has elapsed (step 142). The "ATSC display" timer A11 measures a predetermined time interval T11. The duration of this interval T11 determines the speed of movement of an arrow display symbol across the display unit, this symbol indicating the direction of tape transport, and also determines the speed of rotation of a reel rotation display, during ATSC mode operation. If the predetermined time interval $T_{11}$ measured by the "ATSC display" timer A11 has elapsed, then timer A11 is reset (step 143). A decision is made as to whether the "flashing control" flag F11 is in the "1" state (step 144). If this flag is "1", it is reset to "0", then a decision is made as to whether the tape transport direction is the normal direction (step 146). If the direction is normal, then the variable n is made equal to 4 (step 147), the variable m is made equal to 5 (step 148), and a "normal arrow display data set" subroutine is executed, to produce display of the arrow symbol indicating the tape transport direction (step 149). If on the other hand the tape transport direction is the reverse direction, then the variable n is made equal to 2 (step 150), the variable m is made equal to 5 (step 151), and the "reverse arrow data set" subroutine shown in FIG. 7 is executed, to display an arrow symbol indicating the tape transport direction (step 152). After executing step 149 or 152, the reel rotation display data set subroutine shown in FIG. 8 is executed, to produce display of the reel rotation status (step 153). In step 144, if the "flashing control" flag F11 is "0", then this flag is set to "1" (step 154), and "display data clear" processing is performed, to delete the tape transport direction arrow symbol display and the reel rotation display (step 155). In step 154, if measurement of the predetermined time interval T11 by "ATSC display" timer A11 is in progress, then the positions of the tape transport direction and the reel rotation displays in the ATSC mode are held unchanged.

In step 141, if it is judged that the ATSC mode has not been entered, then a decision is made as to whether the play mode has been entered (step 156). If it is judged, based on the control data from the system controller 25 that the play mode has been entered, then a decision is made as to whether time measurement by the "play display" timer A12 has been completed (step 157). The "play display" timer A12 measures a predetermined time interval T12, whose duration determines the rate of movement of the tape transport direction arrow symbol display, and the speed of rotation of the reel rotation display, during operation in the play mode. If measurement of T12 by timer A12 has ended, i.e. the time interval has elapsed, then the "play display" timer A12 is reset (step 158). If it is judged in step 156 that the play mode has not been entered, then a decision is made as to whether the time measured by the "fast-forward display" timer A13 has elapsed (step 159). The "fast-forward display" timer A13 measures a predetermined time interval T13, which is shorter than interval T12 and whose duration determines the rate of movement of the tape transport direction arrow symbol display and the speed of rotation of the reel rotation display for deck display operation, during the rapid tape transport mode. If measurement by the "fast-forward display" timer A13 has terminated, i.e. the predetermined time interval T13 has elapsed, then timer A13 is reset (step 160). After executing steps 158 and 160, "display data clear" processing is executed, in the same way as for step 155 (step 161), and a decision is made as to whether the play mode has been entered (step 162, FIG. 5(a)-2). If the play mode has not been entered, then since this signifies that the tape deck is operating in the rapid tape transport mode, a decision is made as to whether this is the FF mode (step 163). If it is judged in step 162 that the play mode has been entered, or it is judged in step 163 that the FF mode has been entered, then a decision is made as to whether the tape transport direction is the normal direction (step 164). If it is the normal direction, then a decision is made as to whether the variable n has the value 6, i.e. the value which results in movement of the tape transport direction arrow symbol towards the right on the display (step 165). If n=6, then n is made equal to φ (step 166). If n≠6, then n is made equal to (n+1) (step 167). A decision is then made as to whether the variable m has the value φ, i.e. the value which results in counterclockwise rotation of the reel rotation display (step 168). If variable m=φ, then m is made equal to 7 (step 169). If m≠φ, then m is made equal to (m−1) (step 170). If on the other hand the tape transport direction is the reverse direction, then a decision is made as to whether the variable n is equal to φ, as required to produce rightward movement of the tape transport direction arrow symbol (step 171). If n=φ, then the variable n is made equal to 6 (step 172). If n≠φ, then n is made equal to (n−1) (step 173). A decision is then made as to whether the variable m=7, as required to produce clockwise rotation of the reel rotation display (step 174). If m=7, then m is made equal to φ (step 175). If m≠7, then m is made equal to (m+1) (step 176). If it is judged in step 163 that the deck is not operating in the FF mode, then this indicates operation in the REW mode, and a decision is made as to whether the tape transport direction is the normal direction (step 177). If it is the normal direction, then step 171 is executed, while if it is the reverse direction, then step 165 is executed.

Figures 2, 5A:
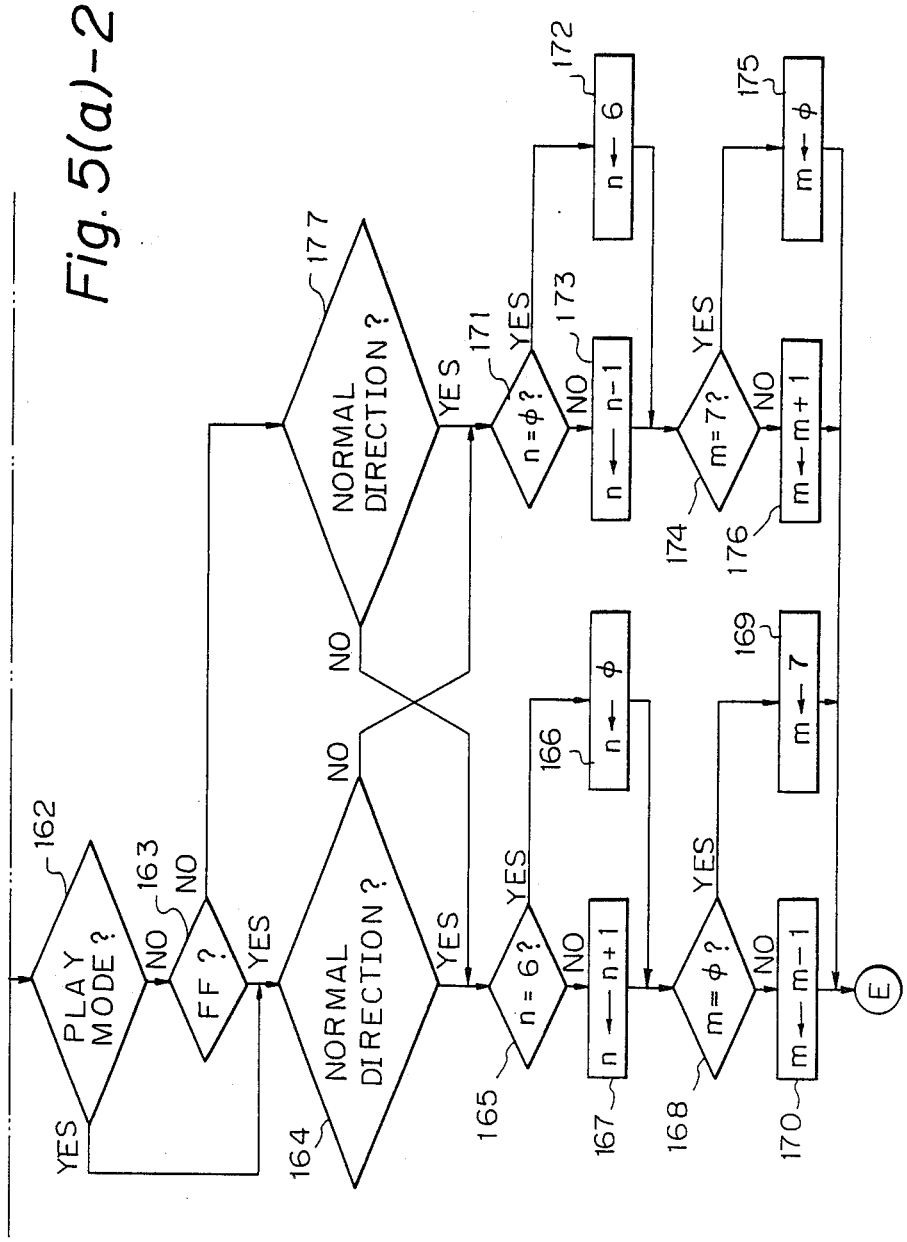
Figures 2, 5C:
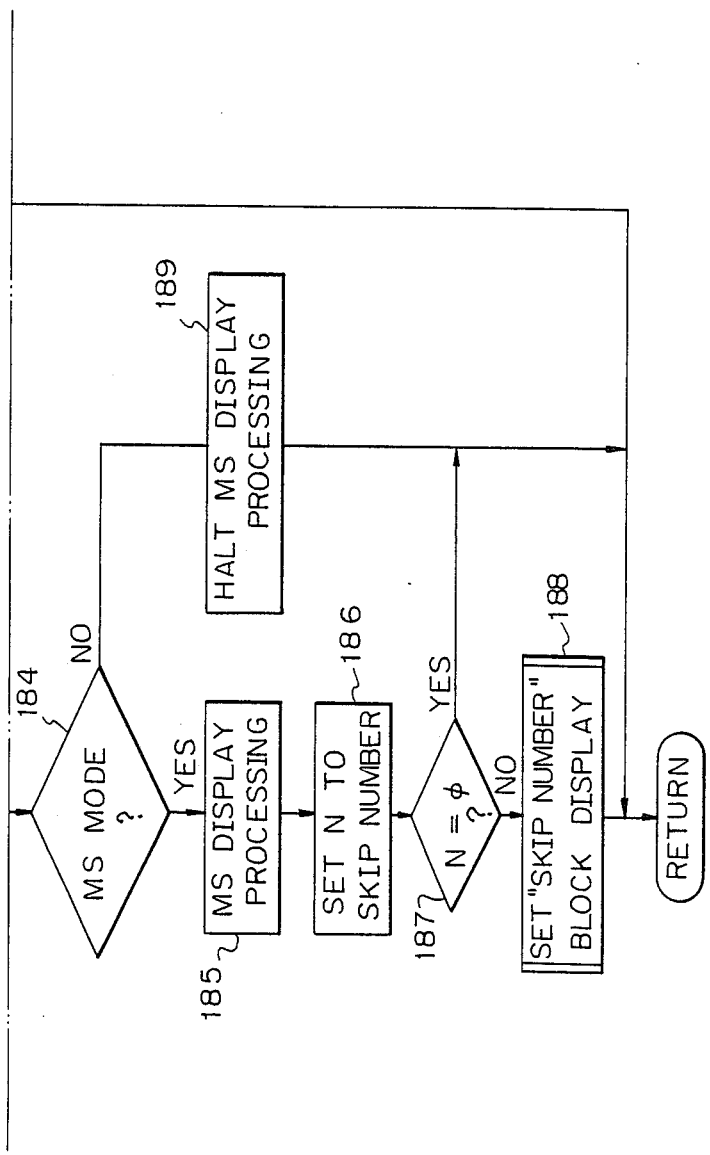

After executing step 169, 170, 175 or 176, a decision is made as to whether the tape transport direction is the normal direction (step 178, FIG. 5(c)-1). If it is the normal direction, then the normal arrow display data set subroutine is executed (step 179), while if it is not the normal direction then the reverse arrow display data set subroutine is executed (step 180). The reel rotation display data set subroutine is then executed (step 181), then a decision is made as to whether a numeral is to be displayed by the numeric segments 33b of fluorescent display panel 33 (step 182). If it is judged, based on the control data from system controller 25, that there are a number of musical items to be skipped over, then numeric display processing is executed (step 183) to produce a display of the corresponding numeral by numeric segments 33b. A decision is then made as to whether the MS mode has been entered, (step 184, FIG. 5(c)-2) and if so, display processing is performed to turn on the display segments 33c of fluorescent display panel 33 (step 185), and the variable N is made equal to the number of musical items to be skipped over (step 186). Next, a decision is made as to whether the variable N=$\phi$ (step 187). If N=$\phi$, then the item skip number block display data set subroutine shown in FIG. 9 is executed (step 188). If N=$\phi$, then execution of the deck display routine is ended. If it is judged in step 184 that the MS mode has not been entered, then display processing is performed to turn off the MS display segments 33c (step 189). If it is judged in step 182 that there is no numeral to be displayed by numeric segments 33b, then display processing is performed to turn of segments 33b (step 190 FIG. 5(c)-1.

In step 157, FIG. 5(a)-1 if it is judged that measurement of the predetermined time interval T12 by the "play display" timer A12 is in progress, or if it is judged in step 159 that measurement of interval T1 by the "fast-forward display" timer A13 is in progress, then step 182, FIG. 5(c)-1 is immediately executed in order to hold the tape transport direction arrow display and the reel rotation display in fixed positions, until the measured time interval has elapsed.

Figure 6:
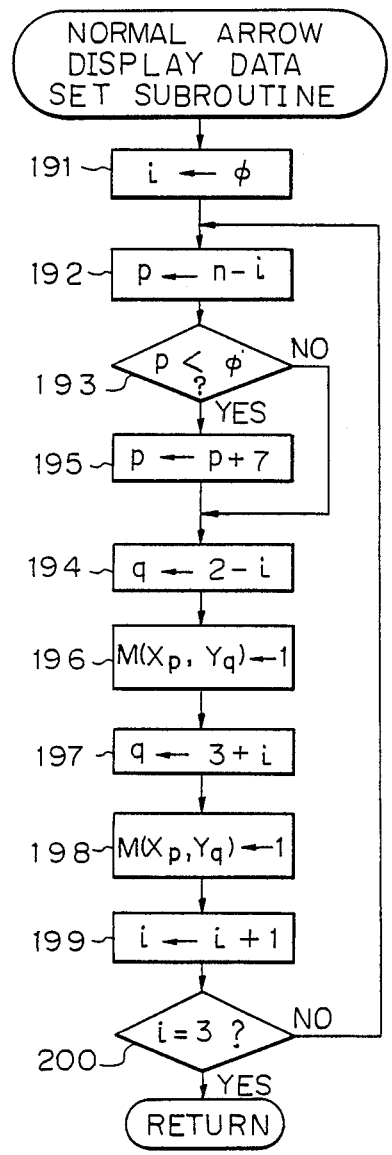

Next, in the normal arrow display data set subroutine, as shown in FIG. 6, the variable i is made equal to $\phi$ (step 191), the variable p is made equal to (n−1) (step 192), and a decision is made as to whether the variable p is less than $\phi$ (step 193). If p is greater than or equal to $\phi$, then the variable q is made equal to (2−i) (step 194), while if p is less than $\phi$, then the variable p is made equal to (p+7), to set p to a value in the range $\phi$ to 6 (step 195), and then step 194 is executed. Next, logic "1" is written into the memory location $M(X_p, Y_q)$ of RAM 31, designated by the address $(X_p, Y_q)$ (step 196) and the variable q is made equal to (3+i) (step 197). In addition, logic "1" is written into memory location $M(X_p, Y_q)$ of RAM 31, designated as address $(X_p, Y_q)$ (step 198). The variable i is then made equal to (i+1) (step 199), and a decision is made as to whether the variable i is equal to 3 (step 200). If i≠3, then step 192 is again executed, while if i=3 then execution of the normal arrow display data set subroutine is ended.

In the reverse arrow display data set subroutine, as shown in FIG. 7, the variable i is made equal to $\phi$ (step 211), the variable p is made equal to (n+1) (step 212), and then a decision is made as to whether the p is greater than 6 (step 213). If p is less than or equal to 6, then q is made equal to (2−q) (step 214), while if p is greater than 6 then p is made equal to (p−7), to thereby set p to a value in the range $\phi$ to 6. Step 214 is then executed. Logic "1" is then written into the memory location $M(X_p, Y_q)$ of RAM 31, designate by address $(X_p, Y_q)$ (step 216) and the variable q is made equal to (3+i) (step 217). In addition, "1" is written into the memory location $M(X_p, Y_q)$ of RAM 31, designated by address $(X_p, Y_q)$ (step 218). The variable i is made equal to (i+1) (step 219), then a decision is made as to whether the value of i is equal to 3 (step 220). If i≠3, then step 213 is again executed, while if i=3 then execution of the reverse arrow display data set subroutine is ended.

The reel rotation display data set subroutine will now be described, referring to FIG. 8. Firstly, the variable j is made equal to $\phi$ (step 231), then a decision is made as to whether the variable m=7 (step 232). If m=7, the variable p is made equal to 1 (step 233), and the variable q is made equal to (12−j) (step 234). If m≠7, a decision is made as to whether m is less than 2 (step 235). If m≦2, then p is made equal to 2 (step 236), and the variable q is made equal to (12−2m−j) (step 237). If m>2, then a decision is made as to whether m≦4 (step 238). If m≦4, then the variable p is made equal to (4−m) (step 239), and the variable q is made equal to (8−j) (step 240). If m>4, then the variable p is made equal to $\phi$ (step 241), and the variable q is made equal to (2m−j) (step 242). After executing step 234, 237, 240, or 242, "1" is written into the memory location $M(X_p, Y_q)$ of RAM 31, designated by address $(X_p, Y_q)$, and the variable p is made equal to (p+4) (step 244), and "1" is written into the memory location $M(X_p, Y_q)$ of RAM 31, designated by address $(X_p, Y_q)$. The variable j is made equal to (j+1) (step 246), and a decision is made as to whether j=2 (step 247). If j≠2, step 231 is again executed, while if j=2, then the reel rotation display data set subroutine execution is ended.

Thus, designating as function $f_N(n)$ the address in RAM 31 which is utilized for the tape transport direction arrow display when tape transport is in the normal direction, and designating as $f_R(n)$ the address in RAM 31 which is utilized for the tape transport direction arrow display when tape transport is in the reverse direction, the following equations are true:

$$f_N(n) = \{(X_{n-i}, Y_{2-i}), (X_{n-i}, Y_{3+i})\} \\ i = 0, 1, 2$$

$$f_R(n) = \{(X_{n+i}, Y_{2-i}), (X_{n+i}, Y_{3+i})\} \\ i = 0, 1, 2$$

In the above, 0<n<6, and 0<n±i<6

Furthermore, designating the address in RAM 31 used for the reel rotation display at the left side of the display panel as the function g(m) and the address in RAM 31 used for reel rotation display at the right side as h(m), the following is true:

$$g(m) = \begin{cases} X_2, Y_{12-2m-j} & 0 \leq m \leq 2 \\ X_{2-m}, Y_{8-j} & m = 3, 4 \\ X_0, Y_{2m-j} & m = 5, 6 \\ X_1, UY_{12-j} & m = 7 \end{cases}$$

$$h(m) = \begin{cases} X_6, Y_{12-2m-j} & 0 \leq m \leq 2 \\ X_{8-m}, Y_{8-j} & m = 3, 4 \\ X_4, Y_{2m-j} & m = 5, 6 \\ X_5, Y_{12-j} & m = 7 \end{cases}$$

In the above it is assumed that 0≦m≦7, and 0≦j≦1.

When "1" is written into the memory location $M(X_p, Y_q)$ of RAM 31, designated by address $(X_p, Y_q)$, the corresponding display segment is turned on. As a result, if the tape transport direction at that time is the normal direction, then assuming that n=3, m=$\phi$, the arrow display symbol 33e and the reel rotation symbols 33g and 33h shown in FIG. 11(a) will appear on the display panel 33. These display symbols serve to display tape transport data. The arrow symbol is made to move across the display at a fixed speed indicative of the tape transport speed, with the arrow pointing in the direction of movement of that symbol, while the reel rotation symbols rotate at a fixed speed indicative of the direction and speed of rotation of the tape reels in the tape cassette being driven by the tape deck.

Each time that n is increased by one during playing in the normal tape transport direction, which occurs each time the predetermined time interval T12 elapses, the arrow symbol 33e is moved to the right, i.e. in the direction indicated by the arrow. More specifically, the arrow symbol 33e is made up of a set of display segments which are set in the light-emitting state, consisting of a first pair of segments disposed mutually adjacent to one another and positioned in one of the vertically disposed groups of segments constituting display section 33a, symmetrically positioned about an axis of symmetry 33d which is parallel to the horizontal axis of the segment array, a second pair of segments in a vertical group of segments positioned immediately to the left of the first pair, symmetrically disposed about the axis of symmetry 33d with two non-activated segments intervening vertically between the segments of that second pair, and a third pair of segments in a vertical group of segments positioned immediately to the left of the second pair, symmetrically disposed about the axis of symmetry 33d with four non-activated segments intervening vertically between the segments of that third pair.

The direction of movement of the arrow symbol 33e and the speed of that movement serves to indicate to the user, in this case, that the tape deck is operating in the play mode, with tape transport being in the normal direction.

If in this condition operation is changed over to the FF rapid tape transport mode, then n is increased by one each time the predetermined time interval T13 elapses, so that the arrow symbol is moved more rapidly than during the play mode, but in the same direction as during the play mode. An indication is thereby given to the user that the tape deck is operating in FF mode, with tape transport in the normal direction. If now operation is changed to the REW rapid tape transport mode, n is decreased by one each time the predetermined time interval T13 elapses, so that the arrow symbol 33e is moved in the opposite direction to that indicated by the arrow, i.e. to the left, with the speed of movement of the arrow symbol being identical to that during the FF mode. The user is thereby notified of FF mode operation, with tape transport in the normal direction.

Figure 11A:
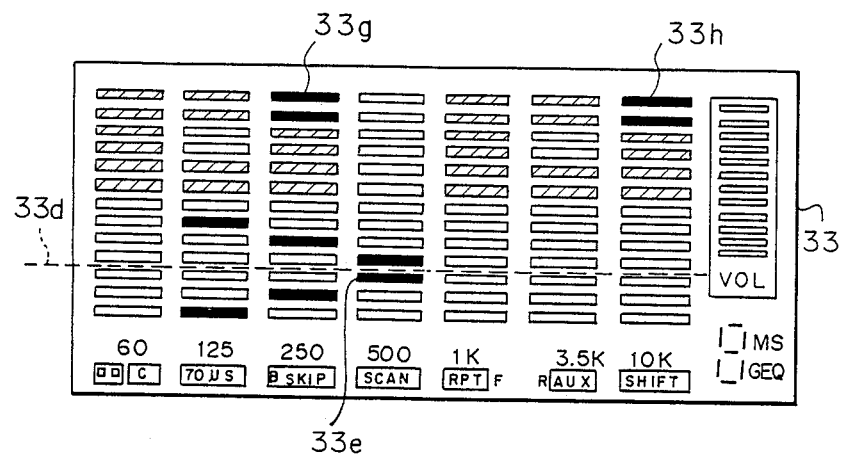
FIGS. 11(a), 11(b) are diagrams for illustrating an arrow symbol and reel rotation symbols displayed on the display panel of the tape deck of FIG. 1 for indicating the direction of tape transport.

In the case of the reel rotation symbols 33g and 33h, during operation in the play mode with tape transport in the normal direction, pairs of display segments disposed mutually adjacent are successively activated to the light-emitting state along a predetermined closed path, as indicated by the hatchedline portions of FIG. 11(a), to produce clockwise rotating display of rotation symbols 33g and 33h. The pair of activated display segments is shifted by one position around the closed path each time the time interval T12 elapses. If operation is changed to the FF rapid tape transport mode, then this shifting of "ON" display segments occurs once each time that interval T13 elapses, thereby producing more rapid rotation of rotation symbols 33g and 33h. If operation is changed to the REW rapid tape transport mode, then the direction of shifting of "ON" display segments is changed to produce a counter-clockwise rotating display, with "ON" segment shifting taking place once each time T13 elapses.

Figure 11B:
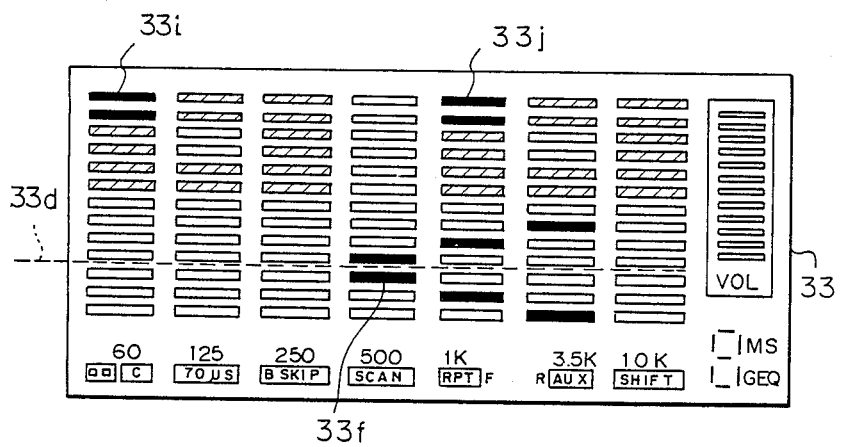
Figure 12A:
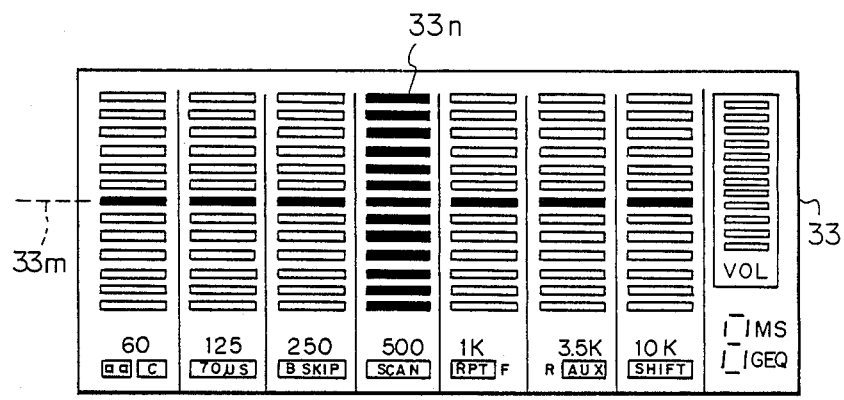
FIGS. 12(a) to 12(d) diagrams for illustrating the display of audio signal level data on the display panel of the tape deck of FIG. 1.
Figure 12B:
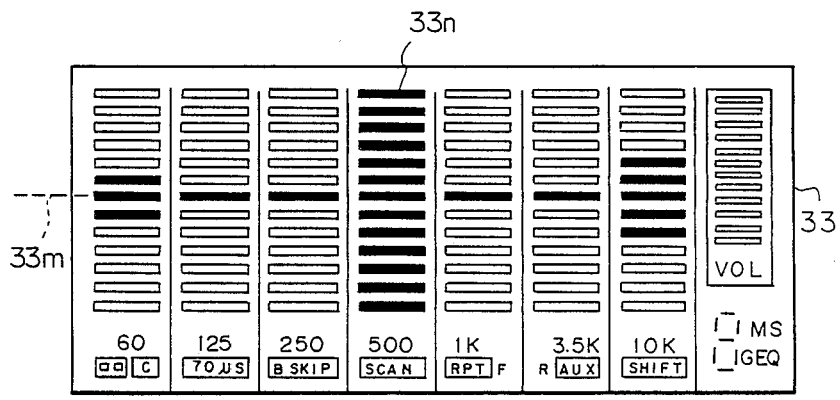
Figure 12C:
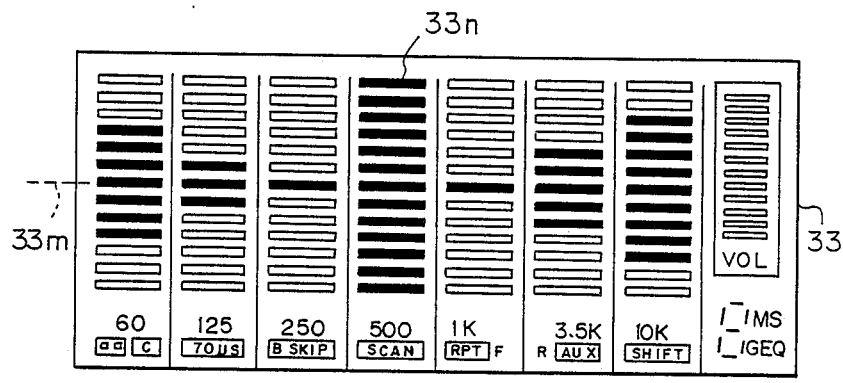
Figure 12D:
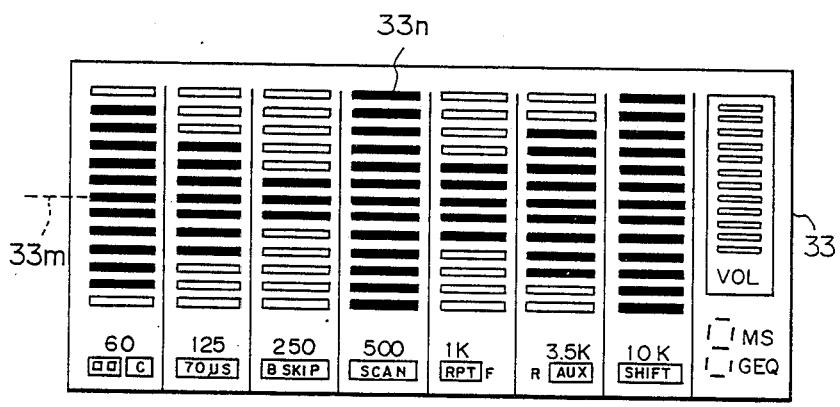

If on the other hand the tape transport direction is the reverse direction, then the tape transport direction arrow display will be as indicated by 33f in FIG. 11(b), and the reel rotation display will be as indicated by 33i and 33j. In the case of the arrow symbol, during play mode operation with the tape transport direction being the reverse direction, the "ON" display segment positions are moved to the left, i.e. in the direction indicated by the arrow, with the symbol being shifted once to the left each time that n is incremented by one, i.e. each time that time interval T12 elapses. In this condition, if changeover to the FF rapid tape transport mode is performed, then n is increased by one each time that interval T13 elapses, so that the arrow symbol is moved to the left more rapidly than during play mode operation. With play mode operation and tape transport in the reverse direction, if the REW rapid tape transport mode is initiated then n is decreased by one each time that interval T13 elapses, so that the arrow symbol 33f is moved to the right, i.e. in the opposite direction to that indicated by the arrow, with the rate of movement of the arrow being the same as that during FF operation.

In the case of the reel rotation symbols 33i, 33j, the positions of the activated segments are moved clockwise, along the path indicated by the hatched line portions in the drawing, each time that interval T12 elapses, during operation in the play mode with tape transport in the reverse direction. If changeover to the FF rapid tape transport mode is performed, then the activated segments are shifted counter-clockwise once each time that interval T13 elapses, while if changeover to the REW rapid tape transport mode is performed, the activated segments are shifted once clockwise each time that interval T13 elapses.

The "item skip number block display data set" subroutine will now be described, referring to FIG. 9. Firstly, a decision is made as to whether the rapid tape transport mode is the FF mode. If it is not FF, then this signifies that it is the REW mode, and a decision is made as to whether the tape transport direction is the normal direction (step 252). If it is the normal direction, then the variable p is made equal to $\phi$ (step 253), and the variable q is made equal to $\phi$ (step 254). Next, the exclusive-OR combination of logic "1" and the contents of memory location M($X_p$, $Y_q$) of RAM 31, designated by address ($X_p$, $Y_q$), is derived, and the result is written into memory location M($X_K$, $Y_L$) (step 255). In this way, if the contents of memory location M($X_p$, $Y_q$) are zero, then a "1" is written into that location. The variable q is then made equal to (q+1) (step 256), and a decision is made as to whether the variable q=6 (step 257). If q≠6, then step 255 is executed, while if q=6, the variable p is made equal to (p+1) (step 258), variable N is made equal to (N−1) (step 259), and a decision is made as to whether variable N=$\phi$ (step 260). If N≠$\phi$, then step 254 is executed, while if N=$\phi$, then execution of this block display data set subroutine is ended.

If on the other hand in step 252 it is judged that the tape transport direction is the reverse direction, then the variable p is made equal to 6 (step 261, the variable q is made equal to $\phi$ (step 262). Next, the exclusive-OR combination of logic "1" and the contents of memory location M($X_p$, $Y_q$) of RAM 31, designated by address ($X_p$, $Y_q$), is derived, and the result is written into memory location $M(X_p, Y_q)$ (step 263), the variable q is made equal to (q+1) (step 264), and a decision is made as to whether the variable q=6 (step 265). If q≠6, then step 263 is executed, while if q≠6, the variable p is made equal to (p−1) (step 266), the variable N is made equal to (N−1) (step 267), and a decision is made as to whether N=φ (step 268). If N≠φ, then step 262 is executed, while if N=φ, then execution of this block display data set subroutine is ended.

If it is judged in step 251 that FF operation is established, then a decision is made as to whether the tape direction is the normal direction (step 269). If it is the normal direction, then step 261 is executed, while if it is the reverse direction then step 253 is executed.

Thus, when REW rapid tape transport is performed in the normal direction, or when FF rapid tape transport is performed in the reverse direction, designating a block as signifying a set of display segments corresponding to X0, X1, X2, X3, X4, X5 or X6 and having a width corresponding to Y0 to Y6, a number of blocks successively extending rightward from position X0 are turned "ON", with the number of these blocks being equal to the item skip number N. Similarly when tape transport is in the reverse direction, during REW operation or when tape transport is in the normal direction during FF operation, a number of blocks successively extending leftward from position X6 are turned "ON", with the number of these blocks being equal to the item skip number.

Figure 10B:
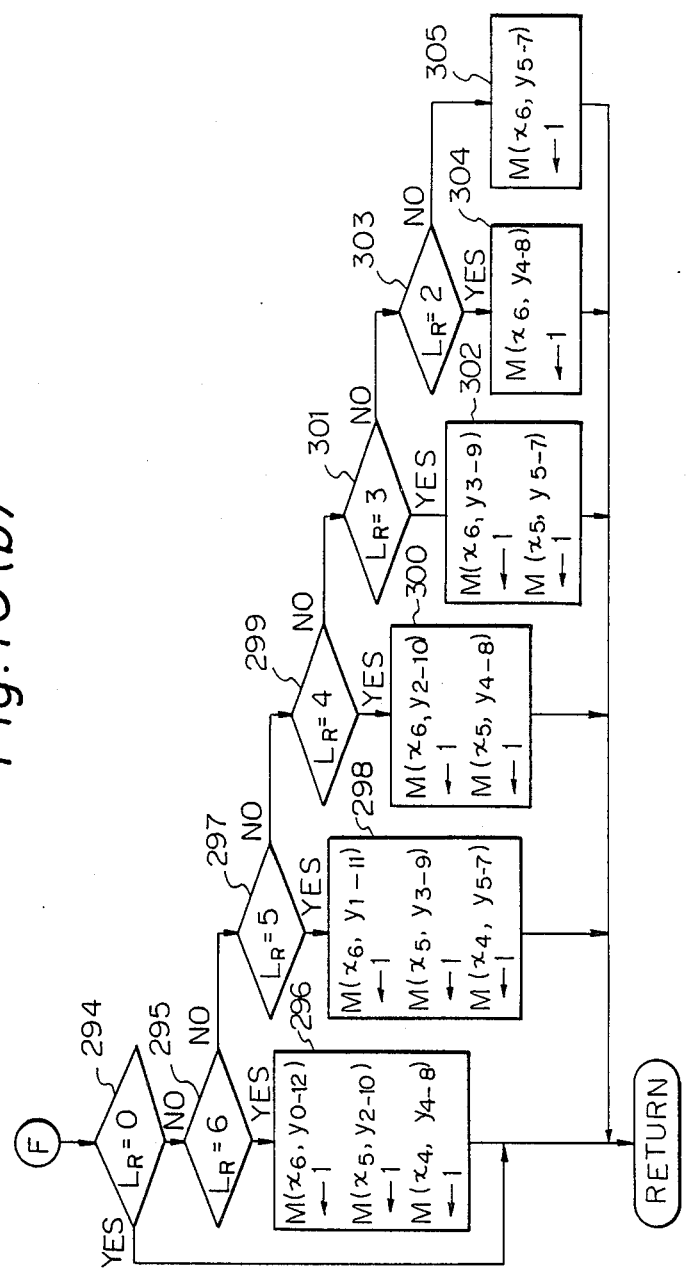

Next, the level display routine will be displayed, referring to FIG. 10. Firstly, a graduated scale display is set (step 281). Specifically, "1" is written into the memory locations $M(X_3, Y_{5\sim12})$, $M(X_{0\sim2}, Y_6)$, and $M(X_{4\sim6}, Y_6)$ of RAM 31. Next, a decision is made as to whether the L-ch level $L_L$ is 0 (step 282). If $L_L \neq 0$, then a decision is made as to whether $L_L=6$ (step 283). If $L_L=6$, then "1" is written into the memory locations $M(X_0, Y_{0\sim12})$, $M(X_1, Y_{2\sim10})$, and $M(X_2, Y_{4\sim8})$ of RAM 31, respectively designated by addresses $(X_0, Y_{0\sim12})$, $(X_1, Y_{2\sim10})$, and $(X_2, Y_{4\sim8})$ (step 284). If $L_L \neq 6$, then a decision is made as to whether $L_L=5$ (step 285). If $L_L=5$, then "1" is written into the memory locations $M(X_0, Y_{1\sim11})$, $M(X_1, Y_{3\sim9})$, and $M(X_2, Y_{5\sim7})$ of RAM 31, respectively designated by addresses $(X_0, Y_{1\sim11})$, $(X_1, Y_{3\sim9})$, and $(X_2, Y_{5\sim7})$ (step 286). If $L_L \neq 5$, then a decision is made as to whether $L_L=4$ (step 287). If $L_L=4$, then "1" is written into the memory locations $M(X_0, Y_{2\sim10})$, $M(X_1, Y_{4\sim8})$ of RAM 31, respectively designated by addresses $(X_0, Y_{2\sim10})$, $(X_1, Y_{4\sim8})$ (step 288). If $L_L \neq 4$, then a decision is made as to whether $L_L=3$ (step 289). If $L_L=3$, then "1" is written into the memory locations $M(X_0, Y_{3\sim9})$, $M(X_1, Y_{5\sim7})$ of RAM 31, respectively designated by addresses $(X_0, Y_{3\sim9})$, $(X_1, Y_{5\sim7})$ (step 290). If $L_L \neq 3$, then a decision is made as to whether $L_L=2$ (step 291). If $L_L=2$, then "1" is written into the memory location $M(X_0, Y_{4\sim8})$, of RAM 31, designated by address $(X_0, Y_{4\sim8})$ (step 292). If $L_L \neq 2$, then this indicates that $L_L=1$, and therefore "1" is written into the memory location $M(X_0, Y_{5\sim7})$, of RAM 31, designated by address $(X_0, Y_{5\sim7})$ (step 293).

If it is found that $L_L=0$ in step 282, and also immediately after executing steps 284, 286, 288, 290, 292 or 293, a decision is made as to whether the R-ch level $L_R$ is 0 (step 294). If $L_R \neq 0$, then a decision is made as to whether LR=6 (step 295). If LR=6, then "1" is written into memory locations $M(X_6, Y_{0\sim12})$, $M(X_5, Y_{2\sim10})$, and $M(X_4, Y_{4\sim8})$ of RAM 31, designated by addresses $(X_6, Y_{0\sim12})$, $(X_5, Y_{2\sim10})$, and $(X_4, Y_{4\sim8}$(step 296). If LR≠6, then a decision is made as to whether LR=5 (step) 297). If LR=5, then "1" is written into memory locations $M(X_6, Y_{1\sim11})$, $M(X_5, Y_{3\sim9})$, and $M(X_4, Y_{5\sim7})$ of RAM 31, designated by addresses $(X_6, Y_{1\sim11})$, $(X_5, Y_{3\sim9})$, and $(X_4, Y_{5\sim7})$ respectively (step 298). If LR≠5, a decision is made as to whether LR=4 (step 299). If LR=4, then "1" is written into memory locations $M(X_6, Y_{2\sim10})$, $M(X_5, Y_{4\sim8})$ of RAM 31, designated by addresses $(X_6, Y_{2\sim10})$, and $(X_5, Y_{4\sim8})$ respectively (step 300). If LR≠4, then a decision is made as to whether LR=3 (step 301). If LR=3, then "1" is written into memory locations $M(X_6, Y_{3\sim9})$ and $M(X_5, Y_{5\sim7})$ of RAM 31, designated by addresses $(X_6, Y_{3\sim9})$ and $(X_5, Y_{5\sim7})$ respectively (step 302). If LR≠3, a decision is made as to whether LR=2 (step 303). If LR=2, then "1" is written into memory locations $M(X_6, Y_{4\sim8})$, designated by address $(X_6, Y_{4\sim8})$ (step 304). If LR=1, "1" is written into memory locations $M(X_6, Y_{5\sim7})$, designated by address $(X_6, Y_{5\sim7})$ (step 305).

Thus, if the L-ch and R-ch levels $L_L$ and $R_R$ are both 0, only the graduated scale display will appear, produced by a vertically aligned set of activated display segments indicated as 33n in in FIG. 12 (a), together with a horizontally aligned set of activated display segments defining a median line 33m. If $L_L$ is 1 and $R_R$ is 2, then the display shown in FIG. 12(b) will appear, with a pair of activated segments symmetrically disposed vertically about the median line 33m on the left side of the display and two pairs of activated segments symmetrically disposed vertically about the median line on the right side of the display. If $L_L$ is 3 and $R_R$ is 4, then the display shown in FIG. 12(c) will appear, with three pairs of activated segments symmetrically disposed vertically about the median line in the leftmost column of the display, and on pair of activated segments similarly disposed in the next column to the right, and 4 pairs of activated segments symmetrically disposed vertically about the median line in the rightmost column of the display, with two pairs of activated segments similarly disposed in the next column to the left. If $L_L$ is 5 and $R_R$ is 6, then the display of FIG. 12(d) will appear.

As described above, with a method of tape deck display control according to the present invention while one of a plurality of items of tape playback audio data is being displayed with the tape deck operating in a play mode, then if a change in operating status of the operating mechanism occurs, for example when the direction of movement of the tape is automatically changed from the forward to the reverse direction (or vice-versa) in the play mode, the display of the tape playback audio data is interrupted and tape transport data is displayed, indicating the change in operating status. In this way, automatic reversal of direction of tape transport is indicated to the user, while in addition, when the user performs manual control of the tape deck, changes in operating status resulting from manual actuations are immediately displayed to the user. Furthermore, after a predetermined time interval has elapsed following such a change in operating status during the play mode, the tape playback audio data for the point immediately prior to the operating status change is once again displayed, i.e. the display of tape playback audio data is restored without the need for manual intervention by the user. This feature is especially convenient for a vehicle-mounted tape deck, in which such manual intervention should be minimized as far as possible.

Although the present invention has been described in the above with reference to a specific embodiment, it should be noted that various changes and modifications to the embodiment may be envisaged, which fall within the scope claimed for the invention as set out in the appended claims. The above specification should therefore be interpreted in a descriptive and not in a limiting sense.

What is claimed is:

1. A display method for displaying control of a tape deck comprising the steps of:
   (a) selectively displaying upon a single display region of a display unit both tape transport data indicating movement of a magnetic tape being driven by said tape deck and also audio data corresponding to audio signals read out from said magnetic tape, said display unit comprising a rectangular array of display segments which can be respectively driven into a light-emitting state;
   (b) during display selection of said tape transport data, activating selected ones of said display segments to said light-emitting state, said selected ones of display segments comprising a first mutually adjacent pair of display segments aligned along a first vertical line of said segment array and symmetrically disposed about a horizontal axis of said segment array, and a second pair of display segments aligned along a second vertical line parallel to said first vertical line of said segment array and disposed symmetrically about said horizontal axis; and
   (c) further during display selection of said tape transport data, shifting selection of said first and second pairs of display segments from said display segments along said horizontal axis of said segment array at a rate corresponding to a speed of transportation of said magnetic tape being driven by said tape deck and in a direction corresponding to a direction of movement of said magnetic tape, wherein said selected ones of display segments are activated such as to indicate movement in a direction parallel to said horizontal axis at a fixed speed indicative of the speed of movement of said magnetic tape and in a fixed direction indicative of the direction of movement of said magnetic tape.

2. A display method as recited in claim 1, wherein said second pair of display segments is positioned a greater distance from said horizontal axis than said first pair, and said shifting step includes maintaining the distance between said first pair of display segments and said horizontal axis constant and the distance between said second pair of display segments and said horizontal axis constant.

3. A display method according to claim 1, further including the step of, during display selection of said audio data, activating selected ones of said display segments to display an audio signal frequency parameter along said horizontal axis of said segment array and an audio signal amplitude along a vertical axis of said segment array.

4. A display method according to claim 1, in which said activated display segments forms the shape of an arrow symbol and in which a direction indicated by said arrow symbol corresponds to the direction of magnetic tape movement.

5. A display method according to claim 1, further comprising the steps of,
   successively activating each of a first plurality of said display segments disposed around a first closed path at one side of said array of display segments to the light-emitting state for generating a first rotation display symbol indicative of rotation of a first tape reel of a tape cassette driven by said tape deck,
   successively activating each of a second plurality of display segments disposed around a second closed path at the opposite side of said array to said first closed path to the light-emitting state for generating a second rotation display symbol indicative of rotation of a second tape reel of said tape cassette, and
   controlling the rate and the direction of said successive activations of display segments to correspond respectively to the speed of rotation and direction of rotation of the corresponding one of said tape first and second reels.

6. A method of display control of a tape deck equipped with a graphic equalizer function, in which both graphic equalizer data and also audio data corresponding to audio signals read out from a magnetic tape of a tape cassette driven by said tape deck while operating in a play mode thereof are selectively displayed on a single display region of a display device, in which said tape deck is further equipped with a plurality of switches actuatable for graphic equalizer operations including at least the setting of a desired graphic equalizer characteristic, comprising the steps of:
   detecting initiation of said graphic equalizer function operation while data other than said graphic equalizer data is being displayed on said display region of said display device;
   immediately displaying said graphic equalizer data on said display region; and
   restoring subsequently, following a predetermined time interval after actuation of any of said graphic equalizer switches, the display so as to display data which was displayed immediately prior to display to said graphic equalizer data.

7. A method of display control according to claim 6, in which said display region comprises a rectangular array of display segments which can be respectively drive into a light-emitting state and which is operable to display said audio data with an audio signal frequency along a horizontal axis of said segment array and an audio signal amplitude along a vertical axis of said segment array.

8. A method of display control according to claim 6, in which said initiation of graphic equalizer function operation is detected based on an initial actuation of any of said graphic equalizer operating switches.

9. A method of display control of a tape deck for selectively displaying upon a single display region of a display unit both tape transport data for indicating an operating status of an operating mechanism of said tape deck and also audio data corresponding to audio signals read out from a magnetic tape of a tape cassette driven by said tape deck comprising the steps of:
   detecting, during display of said audio data while said tape deck is operating in a play mode that a change in said operating mechanism operating status out of said play mode has occurred,
   interrupting the display of said audio data and said displaying tape transport data when said change is detected, and
   displaying again after a predetermined time interval following detection that operation in said play mode has been restored, the audio data displayed at the time point immediately previous to said changeover from the play mode.

10. A method of display control according to claim 9, in which said display region comprises a rectangular array of display segments which can be respectively driven into a light-emitting state and which is operable to display audio data with an audio signal frequency parameter measured along a horizontal axis of said segment array and an audio signal amplitude measured along a vertical axis of said segment array.

* * * * *